United States Patent
Xue et al.

(10) Patent No.: US 11,497,036 B2
(45) Date of Patent: Nov. 8, 2022

(54) ULTRA-RELIABLE LOW-LATENCY COMMUNICATION OVER SIDELINK

(71) Applicant: QUALCOMM Incorporated, San Diego, CA (US)

(72) Inventors: Yisheng Xue, San Diego, CA (US); Chih-Hao Liu, San Diego, CA (US); Xiaoxia Zhang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 47 days.

(21) Appl. No.: 16/910,810

(22) Filed: Jun. 24, 2020

(65) Prior Publication Data

US 2021/0410158 A1    Dec. 30, 2021

(51) Int. Cl.
*H04W 72/12* (2009.01)
*H04W 72/14* (2009.01)
(Continued)

(52) U.S. Cl.
CPC .......... *H04W 72/121* (2013.01); *H04W 4/70* (2018.02); *H04W 28/04* (2013.01);
(Continued)

(58) Field of Classification Search
CPC ..... H04W 72/121; H04W 76/25; H04W 4/70; H04W 28/04; H04W 72/0453;
(Continued)

(56) References Cited

U.S. PATENT DOCUMENTS 11,057,870 B2 *   7/2021   Huang ............... H04W 72/0406
11,082,954 B2 *   8/2021   Huang ............... H04W 72/1289
(Continued)

FOREIGN PATENT DOCUMENTS

WO    2020063611 A1    4/2020

OTHER PUBLICATIONS

3GPP TR 37.985: "3rd Generation Partnership Project; Technical Specification Group Radio Access Network; Overall Description of Radio Access Network (RAN) Aspects for Vehicle-to-Everything (V2X) Based on LTE and NR (Release 16)", 3GPP TR 37.985 V2.0.0 (Jun. 2020), 3GPP Draft, RP-200708, 3rd Generation Partnership Project (3GPP), Mobile Competence Centre, 650, Route Des Lucioles, F-06921 Sophia-Antipolis Cedex, France, Jun. 22, 2020 (Jun. 22, 2020), XP051903408, 36 Pages, Retrieved from the Internet: URL: https://ftp.3gpp.org/tsg_ran/TSG_RAN/TSGR_88e/Docs/RP-200708.zip, 37985-200.docx [retrieved on Jun. 22, 2020] section 5.2.1, p. 13-p. 14 section 6.1, p. 20 section 6.2.1, p. 20-p. 21 section 6.2.4, p. 23 section 6.3.2, p. 24-p. 25 section 6.5.4, p. 29 section 6.5.7, p. 30.
(Continued)

*Primary Examiner* — Parth Patel
(74) *Attorney, Agent, or Firm* — Harrity & Harrity, LLP

(57) ABSTRACT

Various aspects of the present disclosure generally relate to wireless communication. In some aspects, a transmitter user equipment (UE) may transmit a stage one sidelink control information (SCI) message to multiple receiver UEs. In some aspects, the stage one SCI message may indicate respective resource reservations for multiple sidelink transmissions to the multiple receiver UEs. The transmitter UE may transmit a physical sidelink shared channel (PSSCH) to a subset of the multiple receiver UEs based at least in part on a configured grant associated with the subset of the multiple receiver UEs and the respective resource reservations indicated in the stage one SCI message. Numerous other aspects are provided.

30 Claims, 17 Drawing Sheets

(51) Int. Cl.

| | | |
|---|---|---|
| *H04W 72/04* | (2009.01) | |
| *H04W 28/04* | (2009.01) | |
| *H04W 4/70* | (2018.01) | |
| *H04W 76/25* | (2018.01) | |
| *H04W 76/14* | (2018.01) | |
| *H04W 92/18* | (2009.01) | |

(52) U.S. Cl.
CPC ... *H04W 72/0453* (2013.01); *H04W 72/1278* (2013.01); *H04W 72/14* (2013.01); *H04W 76/25* (2018.02); *H04W 76/14* (2018.02); *H04W 92/18* (2013.01)

(58) Field of Classification Search
CPC . H04W 72/1278; H04W 72/14; H04W 76/14; H04W 92/18
See application file for complete search history.

(56) References Cited

U.S. PATENT DOCUMENTS

| | | | |
|---|---|---|---|
| 2016/0066337 A1* | 3/2016 | Sartori | H04W 72/0406 370/329 |
| 2017/0223744 A1 | 8/2017 | Qian et al. | |
| 2019/0104525 A1* | 4/2019 | Santhanam | H04W 72/02 |
| 2020/0053528 A1* | 2/2020 | Wang | H04L 5/0053 |
| 2020/0100215 A1* | 3/2020 | Li | H04W 74/002 |
| 2020/0260472 A1* | 8/2020 | Ganesan | H04W 72/1278 |
| 2020/0304159 A1* | 9/2020 | Liao | H04W 72/042 |
| 2020/0305126 A1* | 9/2020 | Li | H04L 1/0027 |
| 2020/0336253 A1* | 10/2020 | He | H04L 1/1819 |
| 2020/0337096 A1* | 10/2020 | Zhang | H04W 76/11 |
| 2020/0351975 A1* | 11/2020 | Tseng | H04L 5/001 |
| 2020/0359375 A1* | 11/2020 | Hwang | H04W 4/40 |
| 2020/0366419 A1* | 11/2020 | Panteleev | H04B 7/0626 |
| 2020/0374860 A1* | 11/2020 | Panteleev | H04W 72/1278 |
| 2020/0374898 A1* | 11/2020 | Lin | H04W 72/1236 |
| 2020/0404624 A1* | 12/2020 | Roth | H04B 7/0626 |
| 2020/0413295 A1* | 12/2020 | Li | H04W 4/40 |
| 2021/0007020 A1* | 1/2021 | Jiang | H04W 4/40 |
| 2021/0007096 A1* | 1/2021 | Huang | H04W 72/0406 |
| 2021/0028842 A1* | 1/2021 | Kim | H04L 5/0051 |
| 2021/0037468 A1* | 2/2021 | Huang | H04W 4/46 |
| 2021/0045093 A1* | 2/2021 | Rao | H04W 76/14 |
| 2021/0045178 A1* | 2/2021 | Kung | H04W 76/14 |
| 2021/0050950 A1* | 2/2021 | Zhou | H04L 1/1861 |
| 2021/0067290 A1* | 3/2021 | Chen | H04L 5/0033 |
| 2021/0068101 A1* | 3/2021 | Chen | H04W 56/001 |
| 2021/0075552 A1* | 3/2021 | Huang | H04W 72/1278 |
| 2021/0091836 A1* | 3/2021 | Taherzadeh Boroujeni | H04W 72/02 |
| 2021/0099265 A1* | 4/2021 | Shin | H04L 5/0051 |
| 2021/0099901 A1* | 4/2021 | Huang | H04W 24/10 |
| 2021/0105054 A1* | 4/2021 | Gulati | H04L 5/0044 |
| 2021/0105104 A1* | 4/2021 | Cao | H04L 1/1819 |
| 2021/0105754 A1* | 4/2021 | Patel | H04L 5/0053 |
| 2021/0105760 A1* | 4/2021 | Chen | H04W 72/0446 |
| 2021/0112544 A1* | 4/2021 | Chen | H04W 52/242 |
| 2021/0144750 A1* | 5/2021 | Cao | H04W 72/042 |
| 2021/0160014 A1* | 5/2021 | Selvanesan | H04L 5/0053 |
| 2021/0204250 A1* | 7/2021 | Ashraf | H04W 4/70 |
| 2021/0219105 A1* | 7/2021 | Fan | H04W 4/06 |
| 2021/0227622 A1* | 7/2021 | Kung | H04W 76/28 |
| 2021/0250931 A1* | 8/2021 | Yang | H04L 5/0053 |
| 2021/0266923 A1* | 8/2021 | Sarkis | H04W 72/1289 |
| 2021/0297206 A1* | 9/2021 | Manolakos | H04L 5/0051 |
| 2021/0314821 A1* | 10/2021 | Huang | H04L 5/0035 |
| 2021/0315024 A1* | 10/2021 | Sarkis | H04W 74/0858 |
| 2021/0321403 A1* | 10/2021 | Ye | H04W 72/12 |
| 2021/0331587 A1* | 10/2021 | Kim | B60R 11/04 |
| 2021/0331701 A1* | 10/2021 | Hur | B60W 60/0024 |
| 2021/0345356 A1* | 11/2021 | Fan | H04W 72/00 |
| 2021/0377912 A1 | 12/2021 | El Hamss et al. | |
| 2021/0410175 A1 | 12/2021 | Xue | |
| 2022/0077991 A1* | 3/2022 | Hwang | H04L 5/0044 |

OTHER PUBLICATIONS

Convida Wireless: "On Physical Layer Structure for NR V2X Sidelink", 3GPP Draft, 3GPP TSG-RAN WG1 Meeting #98, R1-1909419_ON_PHY_STRUCT_NR_V2X_SL, 3rd Generation Partnership Project (3GPP), Mobile Competence Centre, 650, Route Des Lucioles, F-06921, Sophia-Antipolis Cedex, France, vol. RAN WG1. No. Prague, CZ, Aug. 26, 2019-Aug. 30, 2019, Aug. 17, 2019 (Aug. 17, 2019), XP051766024, pp. 1-5, Retrieved from the Internet: URL: http://www.3gpp.org/ftp/tsg_ran/WG1_RL1/TSGR1_98/Docs/R1-1909419.zip [retrieved on Aug. 17, 2019] the whole document, section 2.1, p. 2-p. 3, figures 1, 2.

Fraunhofer HHI, et al., "Resource Allocation for Mode 1 NR V2X", 3GPP Draft, 3GPP TSG RAN WG1 #99, R1-1912288, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051819982, pp. 1-16, Retrieved from the Internet: URL:https://ftp.3gpp.org/tsg_ran/WG1_RL1/TSGR1_99/Docs/R1-1912288.zip. R1-1912288_Mode1RA.docx [Retrieved on Nov. 8, 2019] box, p. 1 section 3.2. p. 9-p. 10.

International Search Report and Written Opinion—PCT/US2021/070556—ISA/EPO—Sep. 10, 2021.

LG Electronics: "Discussion on Resource Allocation for Mode 2", 3GPP TSG RAN WG1 #99, 3GPP Draft, R1-1912588, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), pp. 1-16, XP051823495, Retrieved from the Internet: URL: https://ftp.3gpp.org/tsg_ran/WG1_RL1/TSGR1_99/Docs/R1-1912588.zip, R1-1912588 Discussion on resource allocation for Mode 2.doc [retrieved on Nov. 9, 2019], The whole document, last set of Agreements; p. 2 section 2.3; p. 14.

Nokia, et al., "Discussion of Physical Layer Structure for Sidelink", 3GPP Draft, 3GPP TSG RAN WG1 #98bis, R1-1910512-NOKIA-5G V2X NRSL—Discussion of Physical Layer Structure for Sidelink, 3rd Generation Partnership Project (3GPP), Mobile Competence Centre, 650, Route Des Lucioles, F-06921, Sophia-Antipolis Cedex, France, vol. RAN WG1. No. Chongqing, China, Oct. 14, 2019-Oct. 20, 2019, Oct. 8, 2019 (Oct. 8, 2019), XP051809140, 16 pages, Retrieved from the Internet: URL: https://ftp.3gpp.org/tsg_ran/WG1_RL1/TSGR1_98b/Docs/R1-1910512.zip R1-1910512-Nokia-5G V2X NRSL-Discussion of physical layer structure for sidelink.docx [retrieved on Oct. 8, 2019] p. 4 p. 5-p. 6, table 1.

* cited by examiner

ULTRA-RELIABLE LOW-LATENCY COMMUNICATION OVER SIDELINK

FIELD OF THE DISCLOSURE

Aspects of the present disclosure generally relate to wireless communication and to techniques and apparatuses for ultra-reliable low-latency communication (URLLC) over a sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a transmitter user equipment (UE), may include: transmitting a stage one sidelink control information (SCI) message to multiple receiver UEs, wherein the stage one SCI message indicates respective resource reservations for multiple sidelink transmissions to the multiple receiver UEs; and transmitting a physical sidelink shared channel (PSSCH) to a subset of the multiple receiver UEs based at least in part on a configured grant associated with the subset of the multiple receiver UEs and the respective resource reservations indicated in the stage one SCI message.

In some aspects, a transmitter UE for wireless communication may include a memory and one or more processors operatively coupled to the memory. The memory and the one or more processors may be configured to: transmit a stage one SCI message to multiple receiver UEs, wherein the stage one SCI message indicates respective resource reservations for multiple sidelink transmissions to the multiple receiver UEs; and transmit a PSSCH to a subset of the multiple receiver UEs based at least in part on a configured grant associated with the subset of the multiple receiver UEs and the respective resource reservations indicated in the stage one SCI message.

In some aspects, a non-transitory computer-readable medium may store one or more instructions for wireless communication. The one or more instructions, when executed by one or more processors of a transmitter UE, may cause the one or more processors to: transmit a stage one SCI message to multiple receiver UEs, wherein the stage one SCI message indicates respective resource reservations for multiple sidelink transmissions to the multiple receiver UEs; and transmit a PSSCH to a subset of the multiple receiver UEs based at least in part on a configured grant associated with the subset of the multiple receiver UEs and the respective resource reservations indicated in the stage one SCI message.

In some aspects, an apparatus for wireless communication may include: means for transmitting a stage one SCI message to multiple receiver UEs, wherein the stage one SCI message indicates respective resource reservations for multiple sidelink transmissions to the multiple receiver UEs; and means for transmitting a PSSCH to a subset of the multiple receiver UEs based at least in part on a configured grant associated with the subset of the multiple receiver UEs and the respective resource reservations indicated in the stage one SCI message.

Aspects generally include a method, device, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
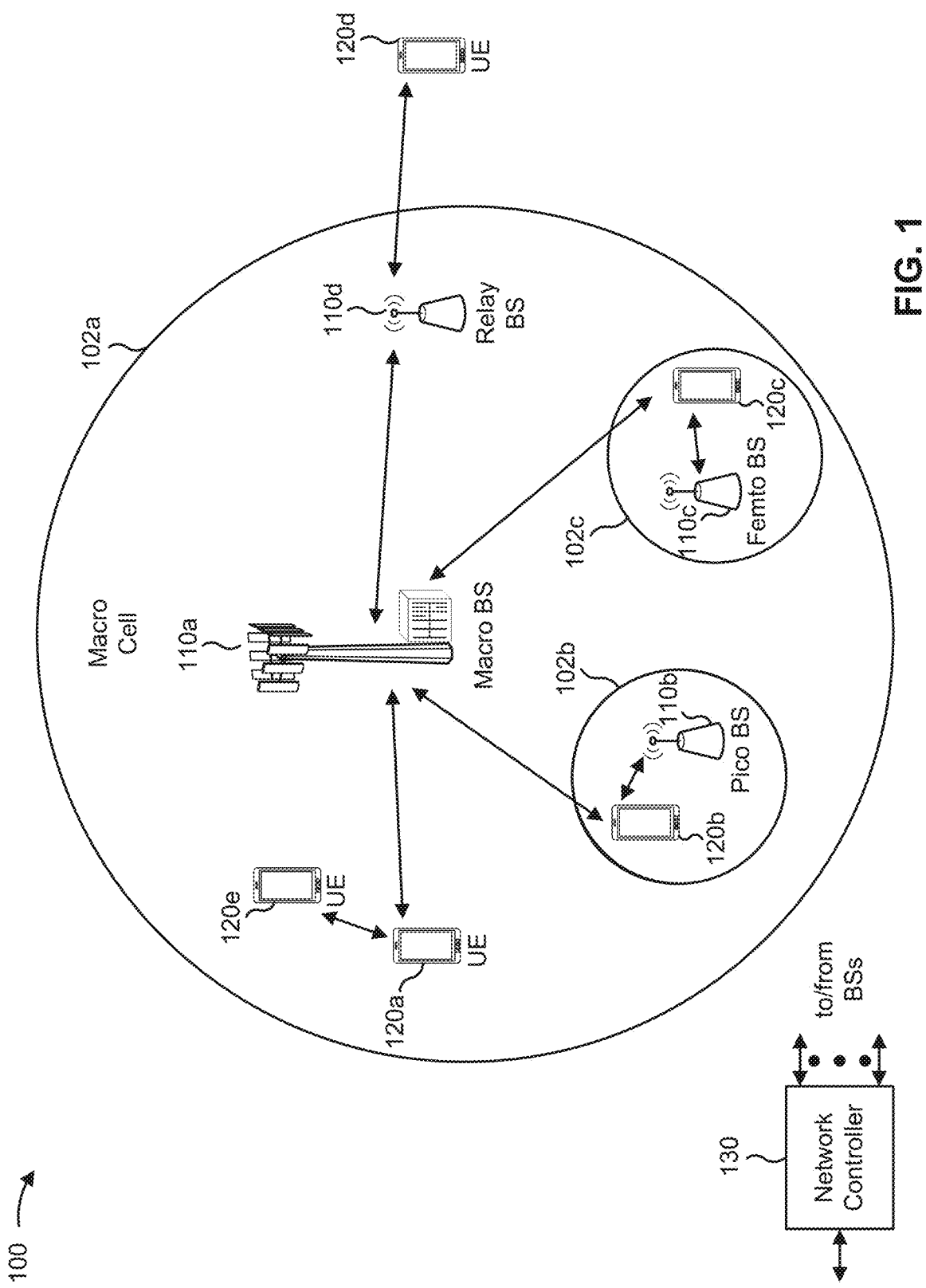
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband Internet-of-Things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, wireless network 100 may support Industrial IoT (IIoT) communications, which generally refers to a branch of cellular technology in which UEs 120 and base stations 110 may be used to communicate control data, measurement data, and/or the like between various industrial systems. For example, IIoT may be used to control a sensor device and/or an actuator device, to exchange measurement information between programmable logic controllers (PLCs) of a factory floor (e.g., in a factory automation application), and/or the like. In many applications, IIoT traffic is treated as ultra-reliable low-latency communication (URLLC) traffic, which imparts strict latency and reliability requirements. In some cases, in addition to URLLC traffic between UEs 120 and base stations 110, IIoT traffic may also use sidelink communications between UEs 120 (e.g., between a PLC UE 120 and a sensor/actuator (S/A) UE 120). For example, IIoT traffic may be handled over a sidelink in deployments with poor network coverage or no network coverage (e.g., in a shielded production cell), to support use cases with a high degree of cooperation among robots and/or or other industrial systems, to offload factory traffic (e.g., using the sidelink for maintenance between a maintaining tablet and an on-demand sensor without interrupting URLLC-based closed-loop control), and/or the like.

However, sidelink communications typically cannot meet stringent URLLC latency and reliability requirements because sidelink communications have relaxed quality of service (QoS) requirements, lower radio efficiency for carrying traffic relative to an access link used for communication between a UE 120 and a base station 110, and/or the like. Accordingly, some aspects described herein relate to techniques and apparatuses to satisfy URLLC requirements over a sidelink. For example, some aspects described herein may conduct an initial transmission using a configured grant or semi-persistent scheduling (SPS) configuration to reduce control overhead. Additionally, or alternatively, some aspects described herein may support retransmissions that are triggered by a negative acknowledgement (NACK) (e.g., rather than performing blind retransmissions, as in a typical sidelink implementation) to improve radio efficiency. Additionally, or alternatively, some aspects described herein may utilize a mini-slot based resource allocation to reduce transmission times, provide multiple switching points within a slot, and facilitate fast switching (e.g., between transmission directions) within a slot. In this way, sidelink communications in a delay-constrained deployment, such as an IIoT deployment, may satisfy stringent latency and reliability requirements.

As indicated above, FIG. 1 is provided as an example. Other examples may differ from what is described with regard to FIG. 1.

Figure 2:
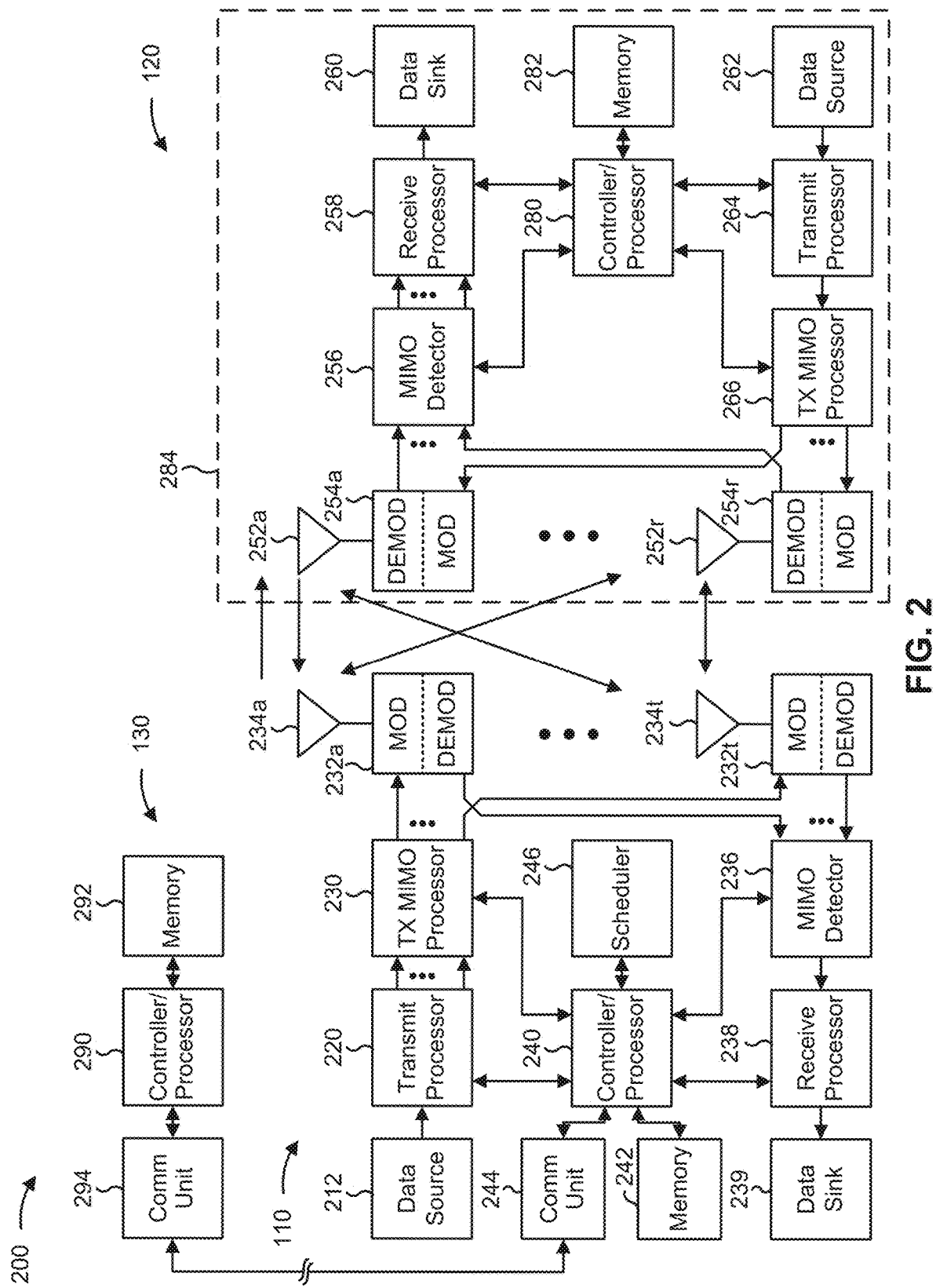
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIG. 7, FIGS. 8A-8C, FIGS. 9A-9D, and/or FIGS. 10-11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIG. 7, FIGS. 8A-8C, FIGS. 9A-9D, and/or FIGS. 10-11.

Controller/processor 240 of base station 110, controller/processor 280 of UE 120, and/or any other component(s) of FIG. 2 may perform one or more techniques associated with ultra-reliable low-latency communication (URLLC) over a sidelink, as described in more detail elsewhere herein. For example, controller/processor 240 of base station 110, controller/processor 280 of UE 120, and/or any other component(s) of FIG. 2 may perform or direct operations of, for example, process 1000 of FIG. 10 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1000 of FIG. 10 and/or other processes as described herein. In some aspects, executing instructions may include running the instructions, converting the instructions, compiling the instructions, interpreting the instructions, and/or the like.

In some aspects, UE 120 may include means for transmitting a stage one sidelink control information (SCI) message to multiple receiver UEs 120, wherein the stage one SCI message indicates respective resource reservations for multiple sidelink transmissions to the multiple receiver UEs 120, means for transmitting a physical sidelink shared channel (PSSCH) to a subset of the multiple receiver UEs 120 based at least in part on a configured grant associated with the subset of the multiple receiver UEs 120 and the respective resource reservations indicated in the stage one SCI message, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
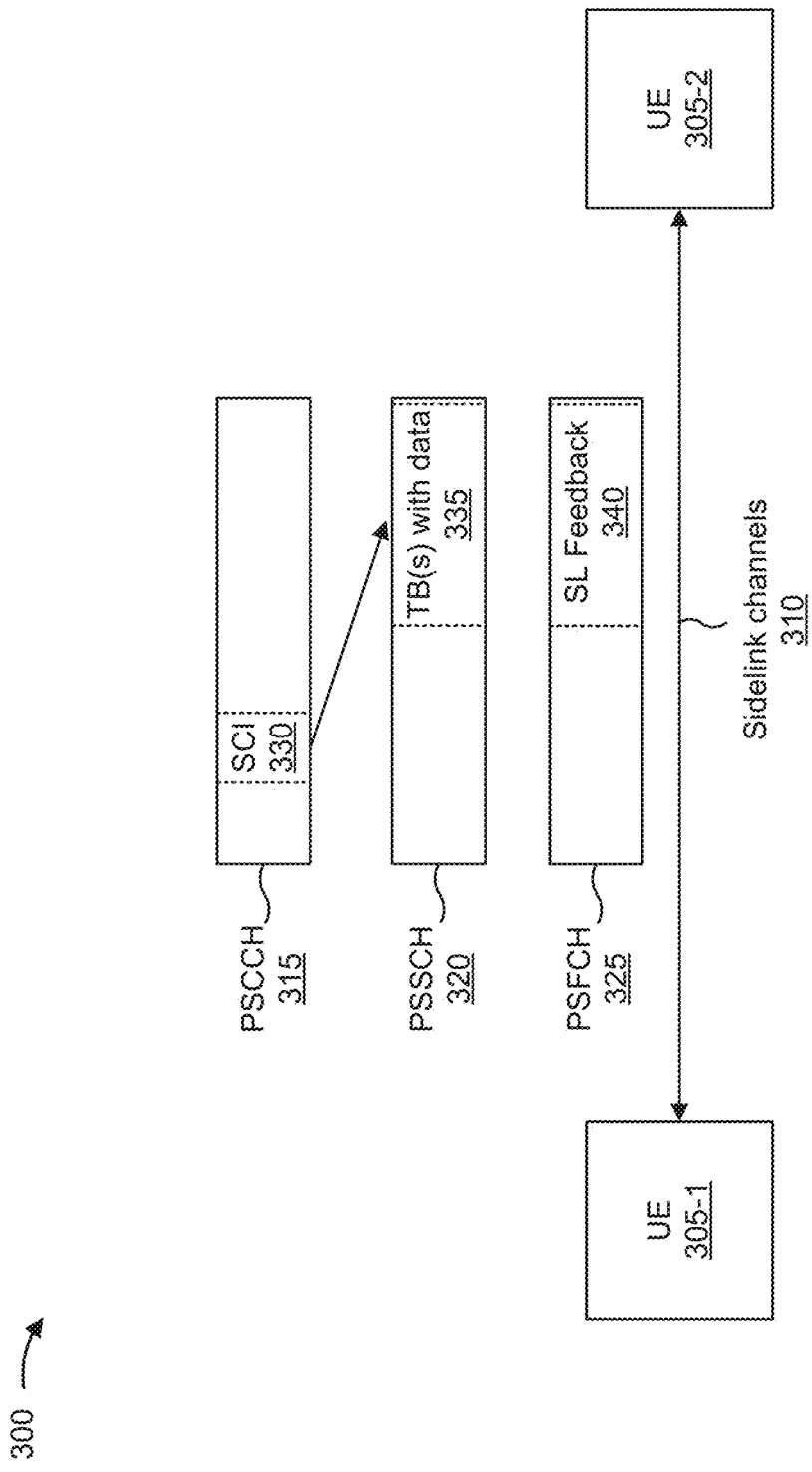
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and/or one or more other UEs 305) via one or more sidelink channels 310. The UEs 305-1 and 305-2 may communicate using the one or more sidelink channels 310 for P2P communications, D2D communications, IIoT communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, a physical sidelink feedback channel (PSFCH) 325, and/or the like. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for SPS, such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
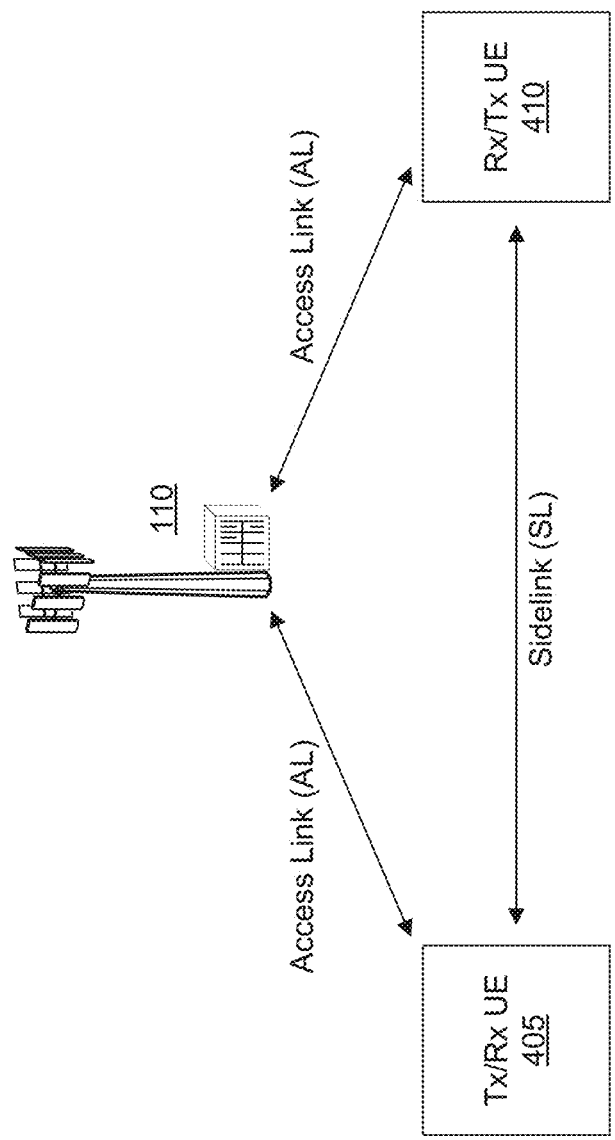
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
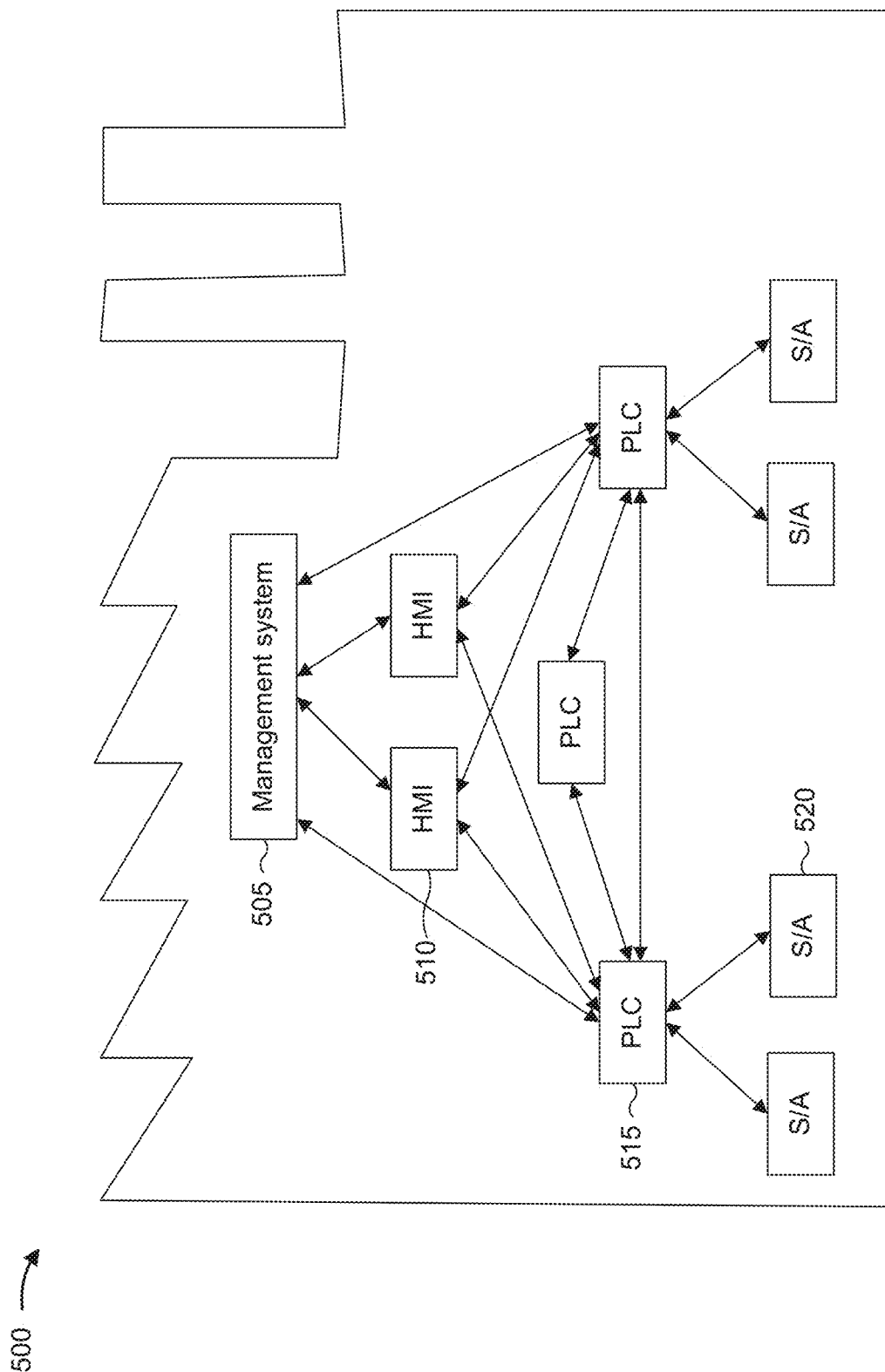
FIG. 5 is a diagram illustrating an example of a delay-constrained deployment, in accordance with various aspects of the present disclosure.

FIG. 5 is a diagram illustrating an example 500 of a delay-constrained deployment, in accordance with various aspects of the present disclosure. In some aspects, the delay-constrained deployment shown in FIG. 5 may be an industrial Internet-of-Things (IIoT) deployment or another suitable deployment in which packets are transmitted and received with delay constraints, reliability constraints, and/ or the like. As shown in FIG. 5, the delay-constrained deployment may include a management system 505, one or more human-machine interfaces (HMIs) 510, one or more programmable logic controller (PLC) UEs 515, and one or more sensor/actuator (S/A) UEs 520.

Management system 505 may include a computer, such as an industrial personal computer or network controller 130, among other possibilities/examples. Management system 505 may perform controller programming, software and security management, or long-term key performance indicator (KPI) monitoring, among other possibilities/examples. In some aspects, management system 505 may perform one or more of the operations described herein as being performed by network controller 130.

HMI 510 may include a user device, such as a tablet computer, a laptop computer, a wearable device (e.g., a smart wristwatch or smart eyeglasses, and/or the like), a mobile phone, a virtual reality device, an augmented reality device, and/or the like. HMI 510 may be used to control one or more machines (e.g., S/A UEs 520) at a factory-floor level. In some aspects, HMI 510 may provide for changing an operational mode of an S/A UE 520.

PLC UE 515 may include a processor (e.g., a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component). PLC UE 515 may communicate with a base station 110 on an access link using uplink/downlink communications or may be associated with a base station 110 that communicates with one or more S/A UEs 520 on an access link using uplink/downlink communications. In some aspects, PLC UE 515 may communicate with one or more S/A UEs 520 using sidelink communications. In some aspects, PLC UE 515 may issue commands and receive sensor inputs in real-time or near real-time from S/A UE 520. In some aspects, PLC UEs 515 and management system 505 may be associated with a backhaul, such as a wireless or wireline backhaul.

S/A UE 520 may include a sensor, an actuator, or another type of IIoT device. For example, S/A UE 520 may be a sensor or actuator, such as a rotary motor, a linear servo, or a position sensor, among other possibilities/examples. In some aspects, S/A UE 520 may include a UE 120, may be included in a UE 120, or may be associated with a UE 120 (such that S/A UE 520 communicates with UE 120 using sidelink communications). In some aspects, S/A UE 520 may be associated with a radio interface via which to communicate with a given PLC UE 515. The radio interface may be scheduled by a base station 110 associated with PLC UE 515 and/or configured based at least in part on configuration information provided by management system 505.

In some aspects, the radio interface may carry data communications between S/A UE 520 (or an associated UE 120) and a base station 110, such as a data communication carrying a status update report associated with an S/A UE 520 or a data communication carrying sensor measurements associated with an S/A UE 520, among other possibilities/ examples. Moreover, the radio interface may carry HARQ feedback associated with the data communications between S/A UE 520 (or an associated UE 120) and a base station 110, a PLC UE 515, and/or the like. For example, in some aspects, the HARQ feedback may include an ACK that may be associated with a data communication to indicate that the S/A UE 520 successfully received and decoded the data communication and/or a NACK associated with a data communication to indicate that the S/A UE 520 fails to receive or successfully decode the data communication.

As indicated above, FIG. 5 is provided as an example. Other examples may differ from what is described with regard to FIG. 5.

Figure 6A:
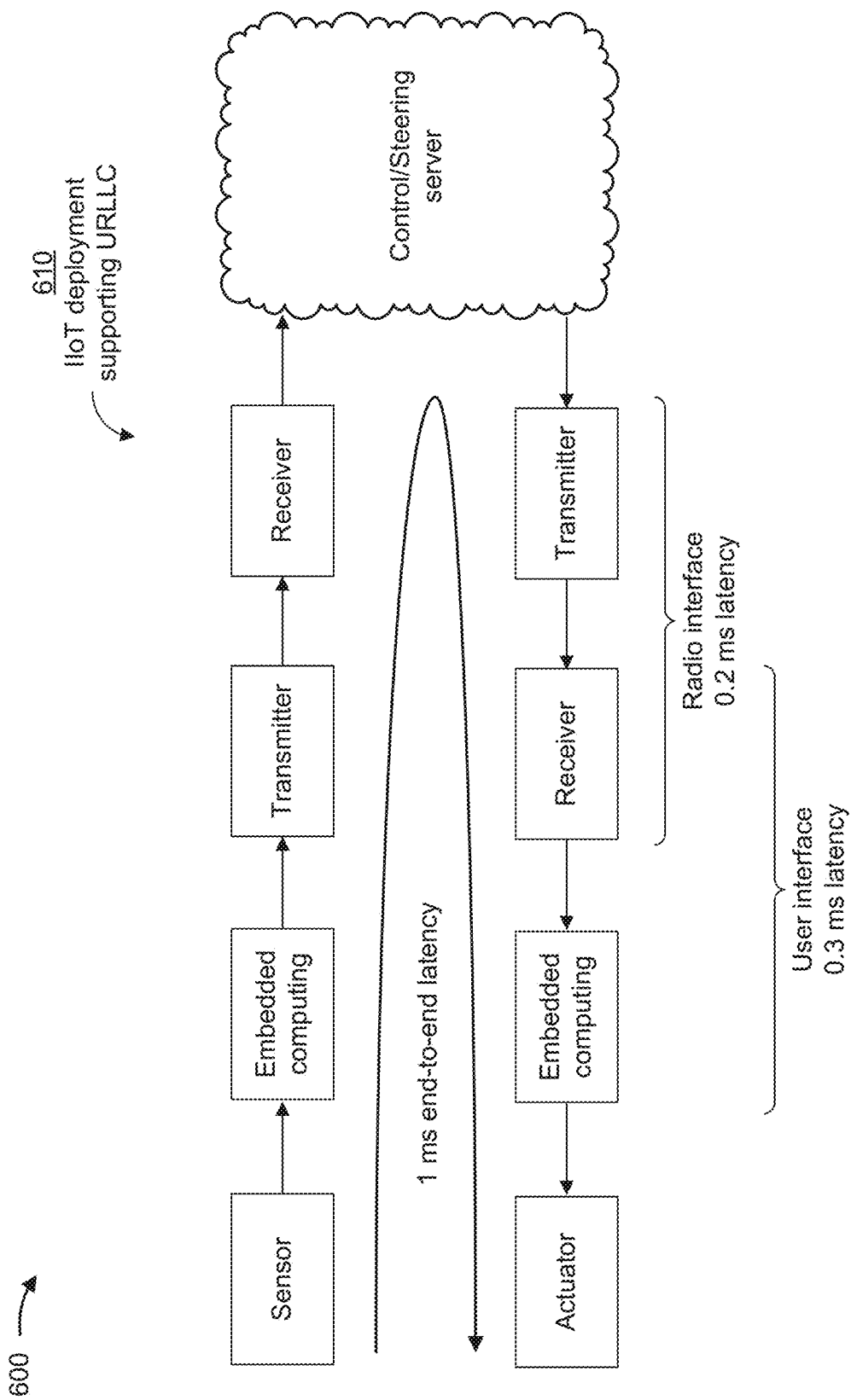
FIGS. 6A-6B are diagrams illustrating examples of ultra-reliable low-latency communication (URLLC), in accordance with various aspects of the present disclosure.
Figure 6B:
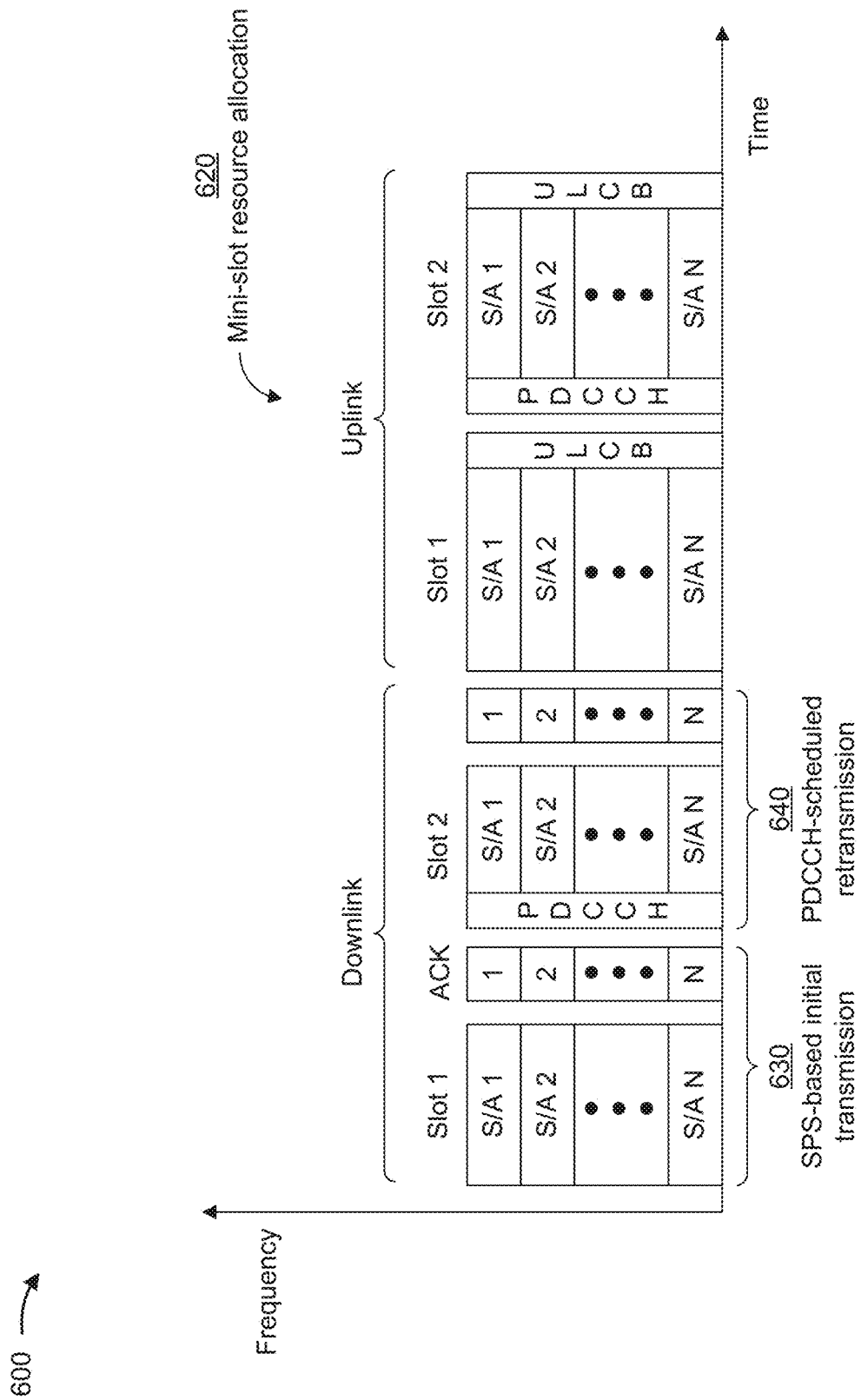

FIGS. 6A-6B are diagrams illustrating examples 600 of ultra-reliable low-latency communication (URLLC), in accordance with various aspects of the present disclosure. For example, as described herein, a wireless network (e.g., wireless network 100) may offer URLLC service to support use cases in which a base station 110 and a UE 120 need to communicate over an access link using a low-latency requirement and/or a high reliability requirement, generally referred to herein as a URLLC requirement. In URLLC, for example, the base station 110 and the UE 120 may be required to satisfy a URLLC requirement in which communicating a packet with a small payload size (e.g., less than or equal to 32 bytes, 256 bytes, and/or the like) satisfies a target reliability metric (e.g., a block error rate (BLER) of $10^{-6}$ or better, a reliability of 99.999% or better, and/or the like) and a target latency (e.g., an end-to-end latency of one millisecond or less). Accordingly, URLLC service may be provided on an access link (e.g., a Uu interface) in a wireless network, such as a 5G or NR network, to support use cases with stringent reliability and latency requirements, which may include public safety, remote diagnosis/surgery, emergency response, autonomous driving, smart energy and grid management, and factory automation, among others.

For example, as shown in FIG. 6A, and by reference number 610, an IIoT (or factory automation) deployment may satisfy a URLLC latency objective. As shown, a sensor in an IIoT deployment may transmit a communication to an embedded computing node, which may forward the communication to a transmitter associated with the IIoT deployment. The transmitter may transmit the communication to a receiver associated with a wireless network (e.g., a receiver associated with a base station 110), which may route the communication to a control/steering server to be processed. After the control/steering server has processed the communication, a response communication may be provided from the control/steering server to a transmitter associated with the wireless network (e.g., a transmitter associated with the base station 110), which may transmit the response communication to a receiver associated with the IIoT deployment.

The receiver may then route the communication to the embedded computing node, which forwards the response communication to an actuator that may perform an action based at least in part on the response communication. Accordingly, to satisfy the URLLC latency objective of a low end-to-end latency (e.g., one millisecond or less), a user interface (e.g., the embedded computing node and the transmitter/receiver associated with the IIoT deployment) may need to have a low one-way latency (e.g., 0.3 milliseconds or less), and a radio interface (e.g., between the transmitter/receiver associated with the IIoT deployment and the receiver/transmitter associated with the wireless network) may need to have a low one-way latency (e.g., 0.2 milliseconds or less).

To satisfy the stringent reliability and latency requirements associated with URLLC service, a radio interface (e.g., an access link or Uu interface) may be designed to efficiently allocate resources to support communication between base stations and UEs. For example, as shown in FIG. 6B, and by reference number 620, URLLC service may be enabled by a mini-slot resource allocation to reduce transmission times, facilitate multiple switching points within a slot, facilitate fast switching (e.g., between downlink and uplink, or vice versa), and/or the like. For example, in a wireless network that supports a scalable numerology, a shorter transmission time can generally be achieved with a larger subcarrier spacing.

Accordingly, the mini-slot resource allocation may define a scheduling unit that is smaller than a typical slot, which enables a URLCC transmission to be quickly scheduled to meet stringent latency requirements. For example, in FIG. 6B, one standard scheduling slot is divided into four mini-slots, which include two mini-slots for downlink communication and two mini-slots for uplink communication. Furthermore, the mini-slot resource allocation may enable URLLC transmissions to preempt other transmissions to immediately transmit data that requires low latency. For example, when resources are unavailable for a URLLC transmission, the URLLC transmission can be scheduled on resources that overlap with ongoing transmissions for other service types (e.g., eMBB), and the preempted transmission can be handled by HARQ feedback, a preemption indication, and/or the like.

Furthermore, as shown by reference number 620, URLLC service may be supported by using SPS for initial transmissions, which enables radio resources to be semi-statically configured and allocated to a UE for a longer time period than one subframe, which may avoid the need for specific downlink assignment messages and/or uplink grant messages over a PDCCH for each subframe. To configure SPS, radio resource control (RRC) signaling may indicate an interval at which the radio resources are periodically assigned.

PDCCH signaling may indicate specific transmission resource allocations in the time/frequency domain and transmission attributes (e.g., periodicity, MCS, time offset, transmit power, and/or the like). Furthermore, URLLC service may enable uplink data transmissions that may be performed without a dynamic grant, generally referred to as a configured grant (CG). More particularly, in a Type 1 CG configuration, a UE can perform uplink data transmission without a grant based at least in part on RRC (re)configuration without any Layer-1 (L1) signaling, and in a Type 2 CG configuration, the UE can perform uplink data transmission without a grant based at least in part on RRC (re)configuration in combination with L1 signaling (e.g., downlink control information) to activate and/or release the Type 2 CG configuration.

Furthermore, as shown by reference number 640, a wireless network may support URLLC service by using PDCCH-scheduled retransmissions that are triggered by a negative acknowledgement (NACK). For example, rather than performing blind retransmissions, which may reduce network capacity, retransmissions may be triggered only when a transmitter receives a NACK for an initial transmission. For example, on a downlink, a base station may conduct an initial SPS-based downlink transmission in a first downlink mini-slot, which includes an uplink control portion in which a UE transmits HARQ feedback to indicate whether the initial downlink transmission was successfully received. Accordingly, the first downlink mini-slot is followed by a second downlink mini-slot in which the base station may transmit a PDCCH to schedule a retransmission for a UE that indicates a NACK for the initial downlink transmission.

Similarly, on an uplink, a UE may conduct an initial uplink transmission in a first uplink mini-slot (e.g., using a configured grant), which includes an uplink common burst portion in which the UE may receive HARQ feedback from the base station indicating whether the initial uplink transmission was successfully received. Accordingly, the first uplink mini-slot is followed by a second uplink mini-slot in which the base station may transmit a PDCCH to dynamically schedule a retransmission of the initial uplink transmission. In this way, by only conducting retransmissions when triggered by a NACK, radio resource efficiency is improved.

Although URLLC service may be supported on an access link or Uu interface using a mini-slot resource allocation, initial downlink and/or uplink transmissions without a dynamic grant (e.g., using SPS or a CG), NACK-triggered retransmissions, and/or the like, there are various scenarios in which access link communications may be unavailable or restricted and/or sidelink communications are more efficient than access link communications. For example, in an IIoT deployment, access link communications may be unavailable in environments with poor network coverage or no network coverage (e.g., in a shielded production cell). In such an example, sidelink communications may be used to enable cooperative operation among robots or other industrial machines on a factory floor. Sidelink communications may also be used to offload network traffic (e.g., by using a sidelink for maintenance between a maintenance device, such as a tablet, and an on-demand sensor without interrupting URLLC-based closed loop control), and/or the like.

However, sidelink communications are typically not designed to satisfy the stringent reliability and latency requirements associated with URLLC use cases. For example, sidelink communications are often designed with a focus on V2X cases, which typically relate to peer-to-peer communications and enabling proper operation when UEs are out of the coverage area of a cellular network. For example, in a sidelink transmission mode (e.g., Mode 2) where resource selection and/or scheduling is performed by a UE to support sidelink operation in the absence of a cellular network, distributed resource allocation typically relies on autonomous sensing for distributed channel access, which causes significant overhead to facilitate sensing. Accordingly, because sidelink communications often have relaxed quality of service (QoS) requirements, especially with respect to the low latency (e.g., one millisecond) that is required for factory automation and other URLLC use cases, a sidelink or PC5 interface generally has a much lower radio efficiency for carrying traffic compared to an access link or Uu interface. As a result, existing techniques for enabling sidelink communications between UEs lack the efficiency to support URLLC traffic.

Some aspects described herein relate to techniques and apparatuses to support URLLC traffic over a sidelink. For example, some aspects described herein relate to sidelink control information (SCI) configurations that may enable an initial transmission to be conducted using a CG (or similar) configuration to reduce control overhead, support NACK-triggered retransmissions to improve radio efficiency, and/or the like. Additionally, or alternatively, some aspects described herein may utilize a mini-slot based resource allocation to reduce transmission times, provide multiple switching points within a slot, and facilitate fast switching (e.g., between transmission directions) within a slot. In this way, some aspects described herein may enable compliance with stringent URLLC latency and reliability requirements for sidelink communications in a delay-constrained deployment, such as an IIoT deployment.

As indicated above, FIGS. 6A-6B are provided as examples. Other examples may differ from what is described with regard to FIGS. 6A-6B.

Figure 7:
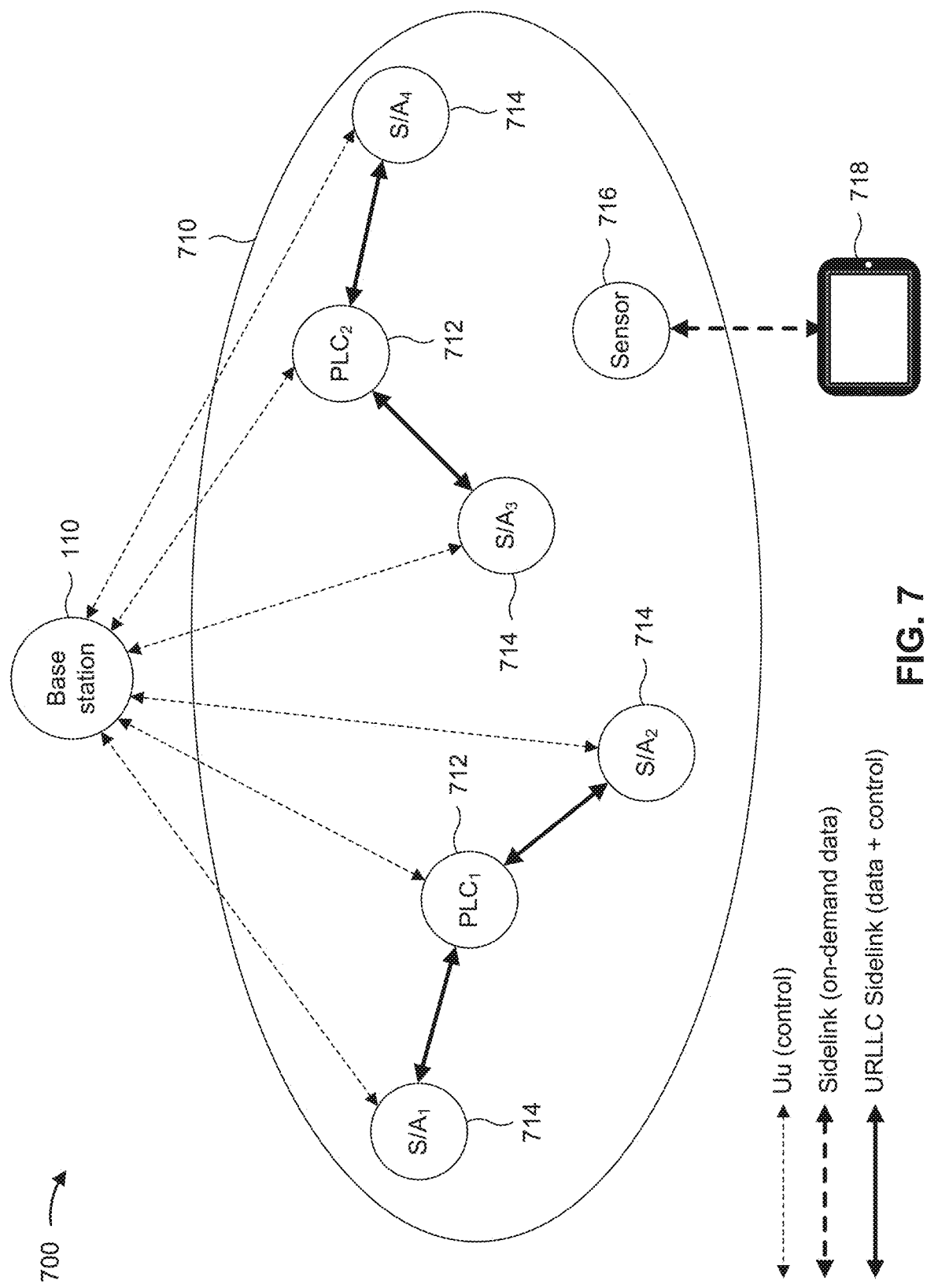
FIG. 7 is a diagram illustrating an example of an industrial Internet-of-Things (IIoT) deployment supporting URLLC over a sidelink, in accordance with various aspects of the present disclosure.

FIG. 7 is a diagram illustrating an example 700 of an IIoT deployment supporting URLLC over a sidelink, in accordance with various aspects of the present disclosure. As shown in FIG. 7, example 700 includes a base station 110 that may communicate with one or more PLC UEs 712 and one or more S/A UEs 714 over an access link or Uu interface, which may provide a low-rate control channel (e.g., when the IIoT deployment is provided in a shielded production cell or another environment with poor network coverage or no network coverage). Accordingly, the IIoT deployment may rely upon sidelink communications for various operations due to the unavailability or limited availability of the access link or Uu interface. For example, as shown, the IIoT deployment includes an on-demand sensor 716 that may communicate with a maintenance device 718 using a sidelink or PC5 interface, which may provide an on-demand high-rate data channel (e.g., to offload traffic from the access link). Furthermore, in some aspects, each PLC UE 712 may communicate with one or more S/A UEs 714 over a URLLC sidelink (e.g., in a star topology that is coordinated by the base station 110, coordinated among the different PLC UEs 712, coordinated by the maintenance device 718, and/or the like). As described herein, the URLLC sidelink may provide a strong radio frequency channel that can be used for high-data rate and control in a manner that may satisfy stringent reliability and latency requirements.

For example, as described above, URLLC service may be supported on an access link or Uu interface by various techniques, which may include conducting initial transmissions without requiring a dynamic grant (e.g., using an SPS configuration for an initial downlink transmission or a CG configuration for an initial uplink transmission) to reduce control overhead, conducting only NACK-triggered retransmissions to improve radio efficiency, providing a mini-slot resource allocation to reduce transmission times and provide multiple switching points within a slot, and/or the like. Accordingly, some aspects described herein may propagate one or more techniques that are used to support URLLC service on an access link or Uu interface to the URLLC sidelink provided on a PC5 interface between the PLC UEs 712 and the S/A UEs 714. For example, as described herein, the URLLC sidelink may be implemented using a SCI configuration that enables the PC5 interface to satisfy high-reliability and low-latency requirements while also maintaining backward compatibility with existing sidelink communication techniques.

For example, existing sidelink communication techniques are generally associated with a physical (PHY) layer configuration and/or a low medium access control (MAC) layer configuration that uses two-stage SCI to indicate various parameters to control sidelink transmissions. In particular, a stage one SCI carried over a PSCCH is generally used to indicate a channel use or resource reservation, and the stage one SCI is blindly decoded by all UEs. The stage one SCI may also contain a pointer to a stage two SCI, which is carried over a PSSCH to indicate additional parameters, such as a transmitter identifier, a receiver identifier, an MCS, HARQ control information associated with a transport block transmitted over the PSSCH, and/or the like. Furthermore, a transmitting UE may transmit the SCI even for a configured grant PSSCH that may be transmitted without a dynamic grant. In some aspects, as described in further detail with reference to FIGS. 8A-8C and FIGS. 9A-9D, the URLLC sidelink implemented on the PC5 interface between the PLC UEs 712 and the S/A UEs 714 may be based at least in part on the two-stage SCI in which a transmitting UE may broadcast or multicast the stage one SCI to one or more receiver UEs and/or transmit the stage two SCI to further indicate UE-specific information.

Furthermore, unicast sidelink communications (e.g., between one transmitter UE and one receiver UE) may be established through upper-layer MAC and higher protocols (e.g., sidelink or PC5 radio resource control (RRC) signaling). Although using upper-layer MAC and higher protocols to establish unicast communications on a sidelink can significantly simplify a design for a physical layer and/or lower MAC layers for V2X use cases that may have relaxed QoS requirements with respect to latency and/or the like, this technique poses challenges with respect to arranging prompt interaction between the physical layer and lower MAC layers for two UEs communicating over a unicast sidelink connection. Accordingly, some aspects described herein may utilize configured grants (e.g., receiver-oriented configured grants) to support statically or semi-statically configured interaction between the physical layer and lower MAC layers for UEs communicating over a unicast sidelink connection. In addition, some aspects described herein may provide an SCI configuration that enables sidelink communications to satisfy strict QoS requirements (e.g., reliability and/or latency requirements), including initial transmissions from a PLC UE 712 to one or more S/A UEs 714, retransmissions from a PLC UE 712 to one or more S/A UEs 714, initial transmissions from one or more S/A UEs 714 to a PLC UE 712, retransmissions from one or more S/A UEs 714 to a PLC UE 712, and/or the like.

As indicated above, FIG. 7 is provided as an example. Other examples may differ from what is described with regard to FIG. 7.

Figure 8A:
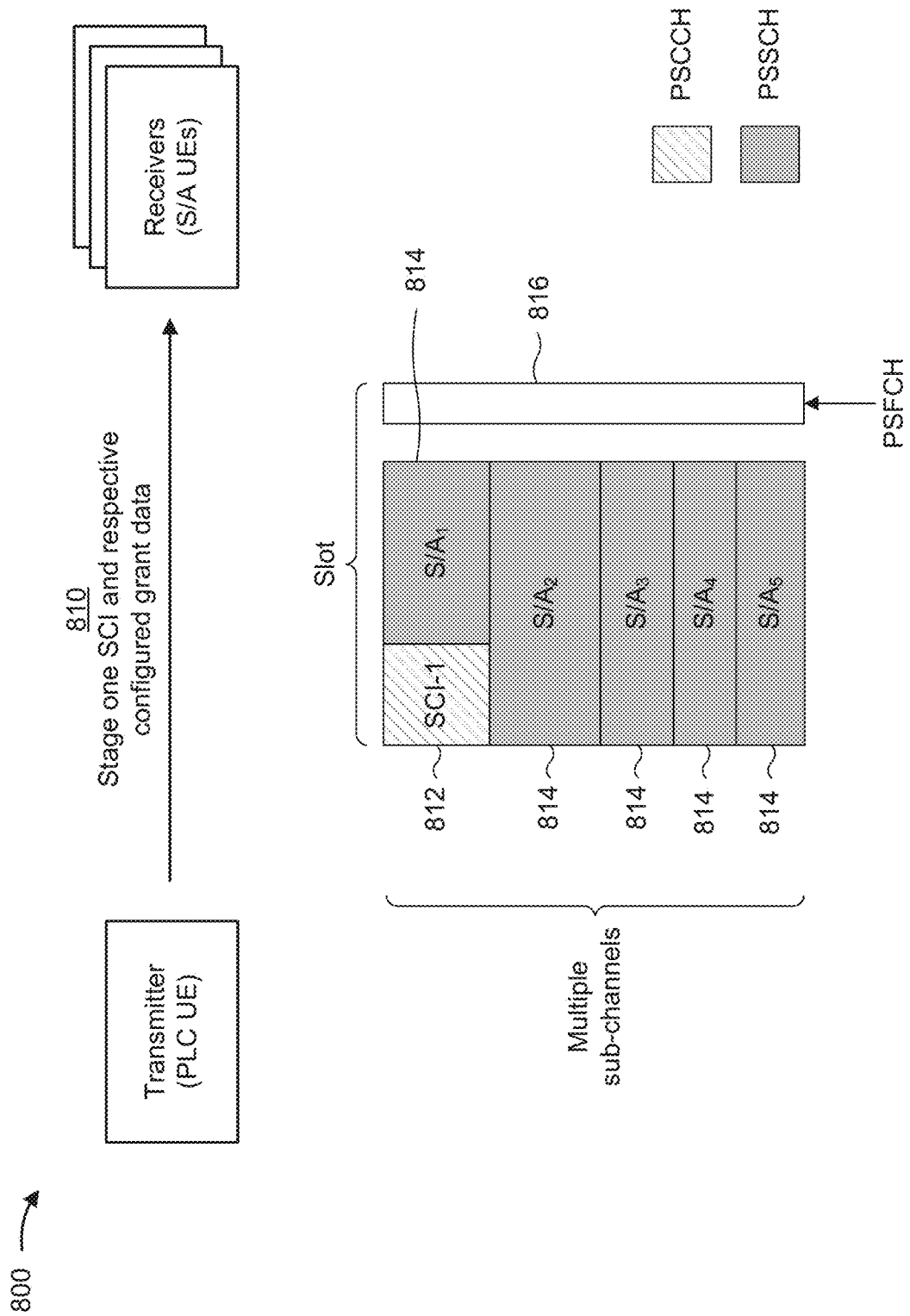
FIGS. 8A-8C are diagrams illustrating examples associated with URLLC over a sidelink, in accordance with various aspects of the present disclosure.
Figure 8B:
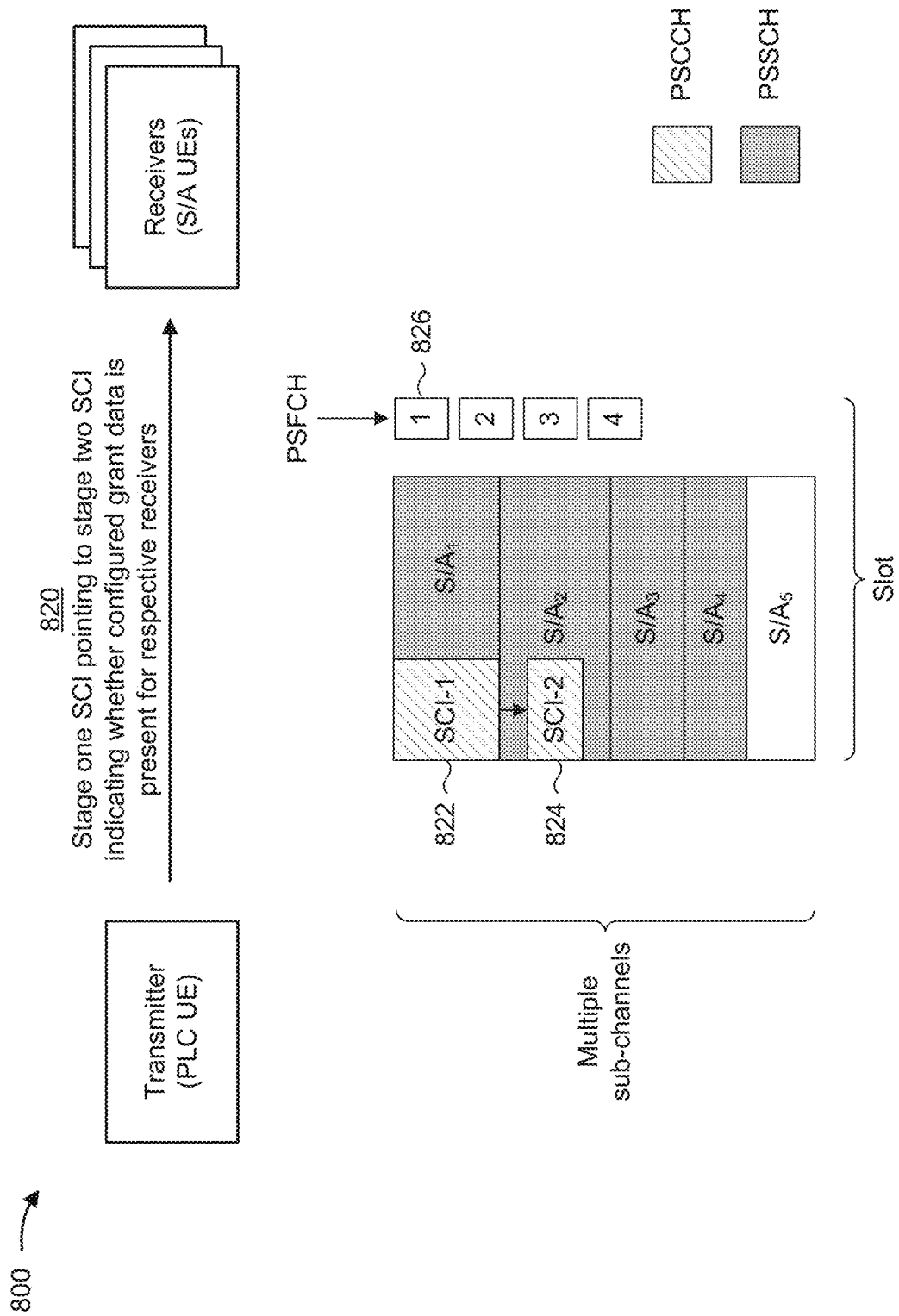
Figure 8C:
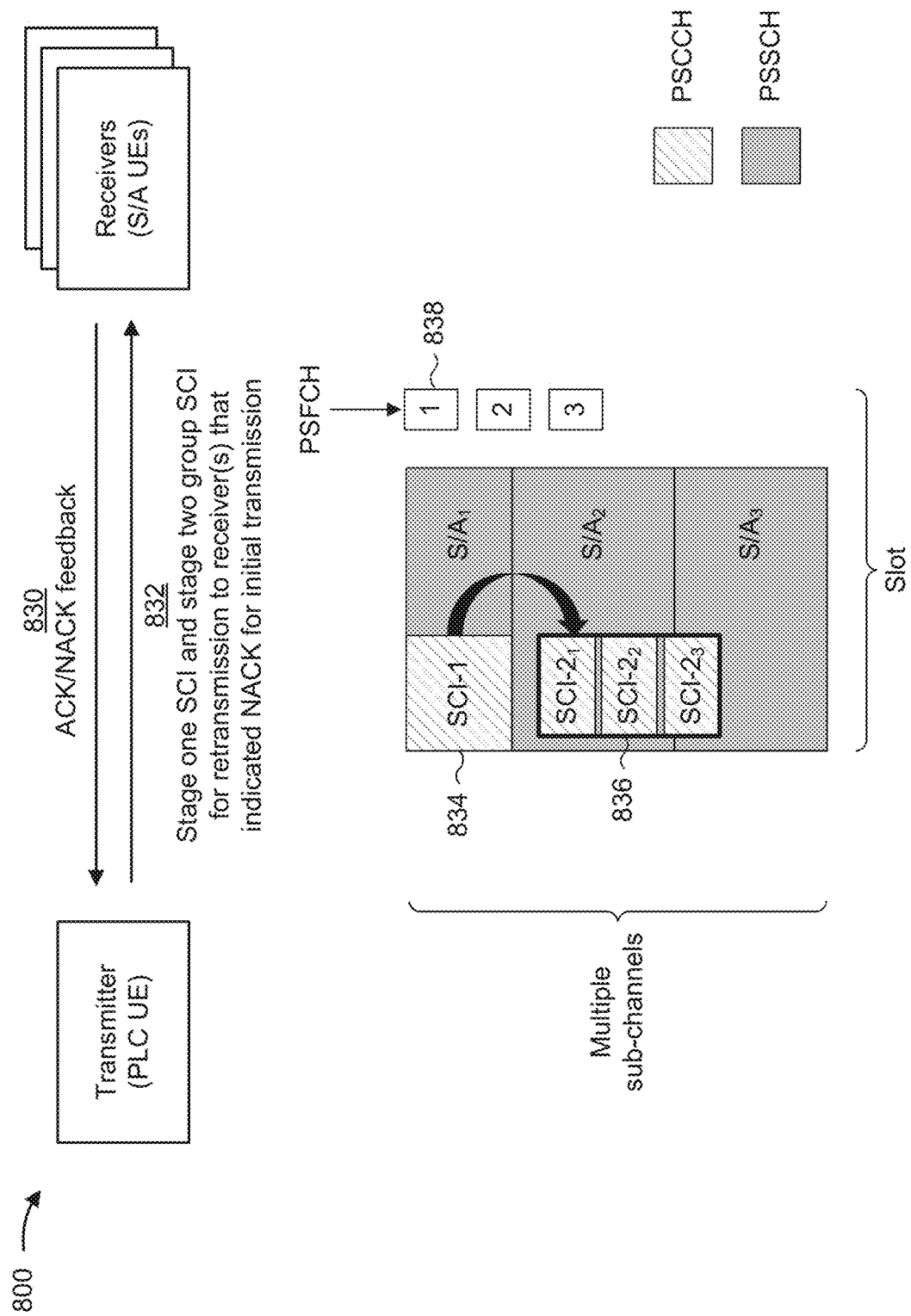

FIGS. 8A-8C are diagrams illustrating one or more examples 800 associated with URLLC over a sidelink, in accordance with various aspects of the present disclosure. As shown in FIGS. 8A-8C, example(s) 800 include a transmitter UE and one or more receiver UEs communicating over a sidelink (or PC5 interface) (e.g., according to a one-to-one or one-to-many configuration). In some aspects, the transmitter UE may correspond to a PLC UE (e.g., PLC UE 515, PLC UE 712, and/or the like) and the receiver UEs may correspond to S/A UEs (e.g., S/A UE 520, S/A UE 714, and/or the like) in an IIoT deployment, a delay-constrained deployment, or another suitable deployment in which UE-to-UE sidelink communications over a radio interface are associated with stringent QoS requirements (e.g., high reliability, low-latency, and/or the like). As described herein, example(s) 800 relate to various techniques to enable the transmitter UE to conduct initial transmissions and/or retransmissions to the receiver UE(s) in a manner that may satisfy the stringent QoS requirements associated with UE-to-UE sidelink communications.

In some aspects, the transmitter UE and the receiver UEs may communicate in one or more delay-constrained time cycles in which a slot used for sidelink communication includes one or more transmission time intervals that are configured as a mini-slot (e.g., in a similar manner as illustrated in FIG. 6B). In this case, the mini-slot configuration may include a first scheduling unit (e.g., a first slot) in which the transmitter UE may transmit a PSCCH and/or an initial PSSCH transmission and further in which the receiver UEs may transmit a PSFCH indicating HARQ feedback for the initial PSSCH transmission. Furthermore, as described herein, the mini-slot configuration may include a second scheduling unit (e.g., a second slot) in which the transmitter UE may transmit an additional PSCCH and/or retransmit the PSSCH for one or more receiver UEs that indicate a NACK for the initial PSSCH transmission.

As shown in FIG. 8A, and by reference number 810, the transmitter UE may transmit (e.g., using controller/processor 280, transmit processor 264, TX MIMO processor 266, MOD 254, antenna 252, transmission component 1106, and/or the like) a PSCCH that includes a stage one sidelink control information message 812 (shown in FIG. 8A as SCI-1) together with a PSSCH that includes respective configured grant data 814 to the one or more receiver UEs. For example, in some aspects, the stage one SCI message 812 may indicate respective resource reservations that the transmitter UE is to use to transmit the configured grant data 814 to the one or more receiver UEs. In other words, the resource reservations indicated in the stage one SCI message 812 may indicate a set of sub-channels that the transmitter UE is occupying in one or more transmission time intervals (e.g., slots, mini-slots, or other scheduling units) in order to transmit the configured grant data 814 to the one or more receiver UEs. For example, in FIG. 8A, the transmitter UE may transmit a PSSCH including respective configured grant data 814 to five (5) receiver UEs (shown as $S/A_1$ through $S/A_5$). Accordingly, each receiver UE may have a receiver-oriented configured grant configuration that enables the respective receiver UE to receive a sidelink data transmission in a particular transmission time interval without requiring a dynamic grant to schedule the sidelink data transmission. For example, in some aspects, the receiver-oriented configured grant may be configured by a base station over access link (Uu) RRC signaling, by the transmitter UE over sidelink (PC5) RRC signaling, and/or the like.

Accordingly, the stage one SCI message 812 may be a common (or group common) stage one SCI message transmitted by the transmitter UE to occupy all of the time and frequency resources to be used for one or more PSSCH transmissions to one or more respective receiver UEs. Furthermore, the stage one SCI message 812 may indicate one or more transmission parameters for all of the receiver UEs (e.g., an MCS, HARQ control information, channel usage or reservation information, and/or the like). In this way, the stage one SCI message 812 may be backwards compatible with existing SCI configurations and may enable dynamic resource coordination among different transmitter UEs (e.g., different PLC UEs, on-demand sensors, and/or the like) by indicating time and frequency resources that are occupied by the transmitter UE. Furthermore, in some aspects, the stage one SCI message 812 may be used as an input to a heartbeat detection algorithm used to maintain respective unicast connections from the transmitter UE to each receiver UE.

In some aspects, the stage one SCI message 812 in combination with the respective configured grant(s) used to transmit the PSSCH to the receiver UE(s) may specify all parameters and related information associated with the transmissions of the configured grant data 814 via the PSSCH. Accordingly, in some aspects, the transmitter UE may refrain from transmitting a stage two SCI message that would otherwise be used in legacy sidelink communications to indicate UE-specific transmission parameters (even in cases where a PSSCH is transmitted using a configured grant that does not require a dynamic grant) because all relevant information is specified in the stage one SCI message 812 and the respective configured grants. Additionally, or alternatively, the transmitter UE may transmit additional SCI messages to one or more of the receiver UEs to override one or more transmission parameters that are indicated in the common stage one SCI message 812. For example, in some aspects, the transmitter UE may transmit an additional UE-specific stage one SCI message to one or more of the receiver UEs, and the UE-specific stage one SCI message may point to a stage two SCI message. Accordingly, the transmitter UE may transmit the stage two SCI message to the one or more receiver UEs to indicate one or more parameters that override a transmission parameter, such as a modulation and coding scheme (MCS) configuration, indicated in the common stage one SCI message 812 applicable to all of the receiver UEs.

Accordingly, as described herein, the transmitter UE may generally transmit one stage one SCI message 812 to occupy a set of resources that the transmitter UE has reserved for transmitting a PSSCH to one or more receiver UEs. For example, in the case of multiple receiver UEs, the PSSCH may include a different transport block for each receiver UE. Accordingly, each receiver UE may attempt to decode the PSSCH transmitted to the respective receiver UE, and each respective receiver UE may transmit a PSFCH 816 that indicates an acknowledgement (ACK) if the PSSCH is successfully received and decoded or a NACK if the receiver UE fails to successfully receive and/or decode the PSSCH. In this way, the transmitter UE may conduct a retransmission for one or more receiver UEs that indicate a NACK for the initial PSSCH transmission, as described below in connection with FIG. 8C.

As shown in FIG. 8B, and by reference number 820, the transmitter UE may alternatively transmit (e.g., using controller/processor 280, transmit processor 264, TX MIMO processor 266, MOD 254, antenna 252, transmission component 1106, and/or the like) a stage one SCI message 822 that points to a stage two SCI message 824 indicating whether configured grant data (e.g., a PSSCH) is present for each respective receiver UE. For example, in some cases, resources to be used for a sidelink transmission to one or more receiver UEs may be unavailable, or traffic intended for one or more receiver UEs may be unavailable, in which case the transmitter UE may refrain from transmitting a PSSCH to such receiver UE(s). In this case, the stage two SCI message 824 may include one or more presence indicators, or presence indication information, to indicate whether a PSSCH carrying configured grant data is present on a reserved resource indicated in the stage one SCI message 822.

Accordingly, in some aspects, the receiver UE(s) may perform non-blind detection for the stage two SCI message 824 (e.g., when the stage one SCI message 822 indicates that a resource is occupied for the corresponding receiver UE) to determine whether a PSSCH carrying configured grant data is present on the reserved resource associated with the respective receiver UE. For example, the stage two SCI message 824 may include a bitmap that provides presence indicators for a set of receiver UEs. For example, as shown in FIG. 8B, the transmitter UE transmits a PSSCH to four receiver UEs (shown as $S/A_1$ through $S/A_4$) and does not transmit a PSSCH to a fifth receiver UE (shown as $S/A_5$). Accordingly, in this example, the bitmap may include five bits that are set to '11110' to indicate that a PSSCH is present for the first four receiver UEs and that a PSSCH is not present for the fifth receiver UE.

Accordingly, in cases where the transmitter UE transmits the stage one SCI message 822 that points to the stage two SCI message 824 carrying the PSSCH presence information for one or more receiver UEs, a receiver UE may transmit a PSFCH 826 to indicate ACK/NACK feedback only in cases where the stage two SCI message 824 indicates that the PSSCH is present for the respective receiver UE. Furthermore, in some aspects, the PSSCH presence information carried in the stage two SCI message 824 may be used to enable multi-path diversity (e.g., fast point selection) in cases where there are multiple data paths from the transmitter UE to a respective receiver UE (e.g., by encoding the PSSCH presence information to select one of the multiple data paths). Additionally, or alternatively, the PSSCH presence information carried in the stage two SCI message 824 may be used to enable variable-rate control for one or more receiver UEs. For example, in some cases, URLLC service may limit a payload size to 32 bytes with a one millisecond latency, but in some cases the sidelink between the transmitter UE and the receiver UE may be able to transmit a larger payload size and still satisfy a latency constraint. Accordingly, in some aspects, the PSSCH presence information may be used to encode or otherwise indicate a data rate to be used for the sidelink transmission from the transmitter UE to the receiver UE to enable variable rate control.

As shown in FIG. 8C, and by reference number 830, the transmitter UE may receive (e.g., using antenna 252, DEMOD 254, MIMO detector 256, receive processor 258, controller/processor 280, reception component 1102, and/or the like) ACK/NACK feedback via a PSFCH from one or more receiver UEs. For example, the transmitter UE may conduct an initial PSSCH transmission to one or more receiver UEs as described above in connection with FIG. 8A and/or FIG. 8B. Accordingly, the transmitter UE may receive the ACK/NACK feedback from each receiver UE that was the intended recipient of an initial PSSCH transmission (e.g., as indicated in a stage one and/or stage two SCI message).

As further shown in FIG. 8C, and by reference number 832, the transmitter UE may transmit (e.g., using controller/processor 280, transmit processor 264, TX MIMO processor 266, MOD 254, antenna 252, transmission component 1106, and/or the like) a stage one SCI message 834 and a stage two group SCI message 836 to schedule a PSSCH retransmission to each receiver UE that indicates a NACK for the initial PSSCH transmission. For example, in some aspects, the stage one SCI message 834 may indicate a total resource allocation to be used for retransmissions in the slot to be used for the retransmissions (e.g., a set of sub-channels that the transmitter UE has reserved or is otherwise occupying for the retransmissions). Furthermore, the stage one SCI message 834 may point to the stage two group SCI message 836, which may include detailed grants for the retransmissions to each receiver UE that indicates a NACK for the initial PSSCH transmission.

For example, in FIG. 8C, three receiver UEs (shown a $S/A_1$ through $S/A_3$) may indicate a NACK for an initial PSSCH transmission, whereby the stage one SCI message 834 may indicate the total resource usage in the slot to be used for retransmissions to the three receiver UEs. Furthermore, the stage two SCI message 836 may include three dynamic grants scheduling the retransmissions to each of the three receiver UEs. For example, each dynamic grant carried in the stage two SCI message 836 may indicate one or more sub-channels to be used for the retransmission to a respective receiver UE. Furthermore, in some aspects, the stage two SCI message 836 may include a single cyclic redundancy check (CRC) and/or a sub-channel based message structure to reduce overhead (e.g., relative to including a separate CRC for each dynamic grant and/or indicating each dynamic grant in a separate stage two SCI message). Accordingly, as further shown by reference number 838, the receiver UEs that indicated a NACK for the initial transmission may transmit a PSFCH to provide ACK/NACK feedback for the PSSCH retransmission.

As indicated above, FIGS. 8A-8C are provided as examples. Other examples may differ from what is described with regard to FIGS. 8A-8C.

FIGS. 9A-9D are diagrams illustrating one or more examples 900 associated with URLLC over a sidelink, in accordance with various aspects of the present disclosure. As shown in FIGS. 9A-9D, example(s) 900 include one or more transmitter UEs communicating with a receiver UE over a sidelink (or PC5 interface) (e.g., according to a one-to-one or many-to-one configuration). In some aspects, the transmitter UEs may correspond to S/A UEs (e.g., S/A UE 520, S/A UE 714, and/or the like) and the receiver UE may correspond to a PLC UE (e.g., PLC UE 515, PLC UE 712, and/or the like) in an IIoT deployment, a delay-constrained deployment, or another suitable deployment in which UE-to-UE sidelink communications over a radio interface are associated with stringent QoS requirements (e.g., high reliability, low-latency, and/or the like). As described herein, example(s) 900 relate to various techniques to enable the transmitter UE(s) to conduct initial transmissions and/or retransmissions the receiver UE in a manner that may satisfy the stringent QoS requirements associated with UE-to-UE sidelink communications.

In some aspects, the transmitter UE and the receiver UEs may communicate in one or more delay-constrained time cycles in which a slot used for sidelink communication includes one or more transmission time intervals that are configured as a mini-slot (e.g., in a similar manner as illustrated in FIG. 6B). In this case, the mini-slot configuration may include a first scheduling unit (e.g., a first slot) in which the transmitter UE(s) may transmit a PSCCH and/or an initial PSSCH transmission and further in which the receiver UE may transmit a PSFCH, an enhanced PSFCH (ePSFCH), or a further enhanced PSFCH (fePSFCH) indicating HARQ feedback for the initial PSSCH transmission. Furthermore, as described herein, the mini-slot configuration may include a second scheduling unit (e.g., a second slot) in which the transmitter UE(s) may transmit an additional PSCCH and/or retransmit the PSSCH in cases where the receiver UE indicates a NACK for one or more of the initial PSSCH transmissions by the one or more transmitter UEs.

Figure 9A:
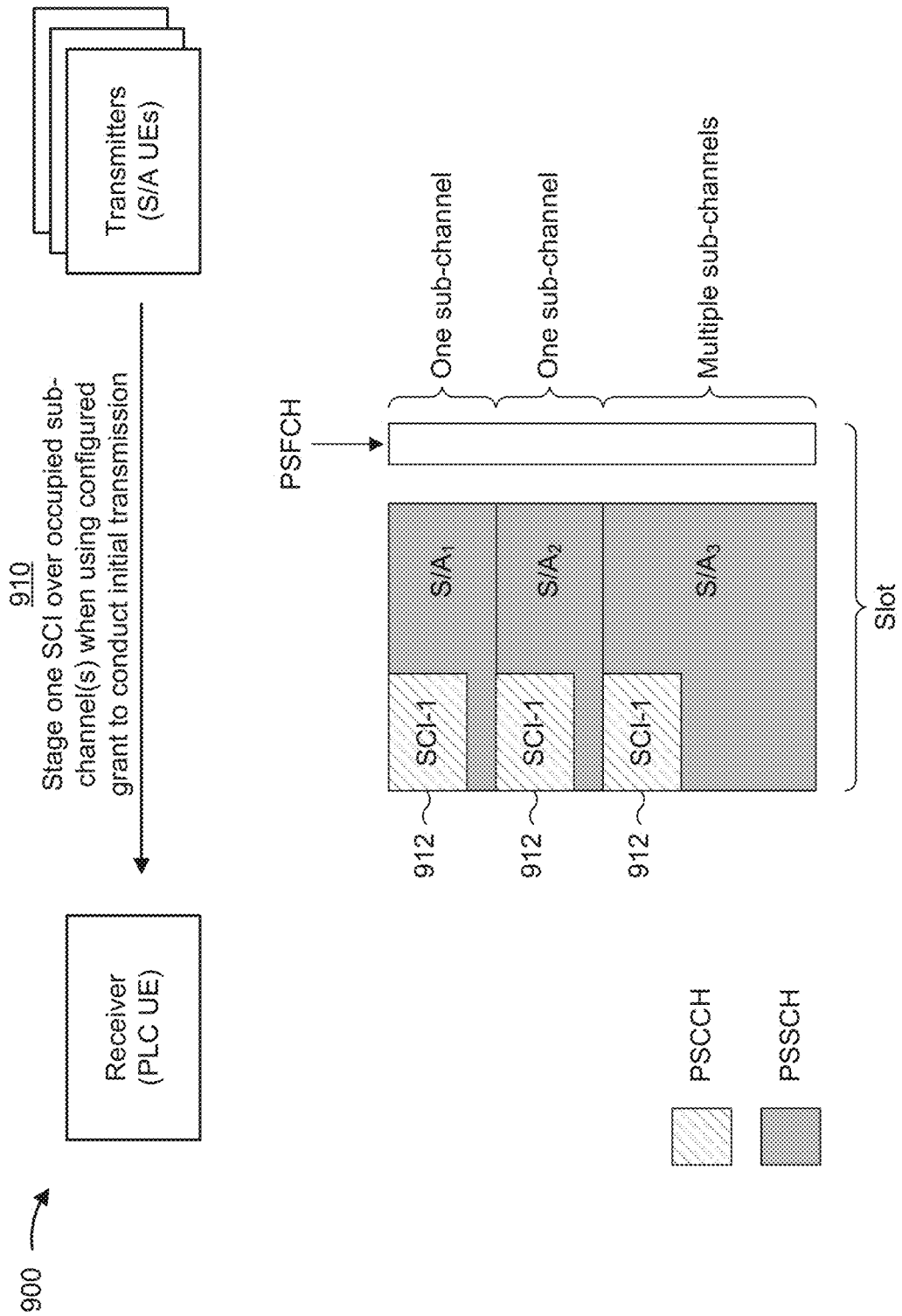
FIGS. 9A-9D are diagrams illustrating examples associated with URLLC over a sidelink, in accordance with various aspects of the present disclosure.

As shown in FIG. 9A, and by reference number 910, one or more transmitter UEs may each transmit (e.g., using controller/processor 280, transmit processor 264, TX MIMO processor 266, MOD 254, antenna 252, transmission component 1106, and/or the like) a stage one SCI message 912 over one or more sub-channels that are occupied by the respective transmitter UE when using a configured grant to conduct an initial transmission to a receiver UE. For example, in FIG. 9A, three transmitter UEs may transmit a PSCCH that carries the stage one SCI message 912, and the three transmitter UEs further transmit a PSSCH over one or more occupied sub-channels. For example, a first transmitter UE (S/A$_1$) occupying a first sub-channel to transmit a first PSSCH to the receiver UE may transmit a first stage one SCI message 912 over the first sub-channel. In the same example, a second transmitter UE (S/A$_2$) occupying a second sub-channel to transmit a second PSSCH to the receiver UE may transmit a second stage one SCI message 912 over the second sub-channel. In the same example, a third transmitter UE (S/A$_3$) occupying multiple sub-channels may transmit a third PSSCH to the receiver UE may transmit a third stage one SCI message 912 over the multiple occupied sub-channels. Furthermore, as described herein, each transmitter UE may have a configured grant (e.g., configured by a base station over access link or Uu RRC signaling, by the receiver UE over sidelink or PC5 RRC signaling, and/or the like) that is used to transmit the respective PSSCH over the occupied sub-channel(s) without a dynamic grant.

In some aspects, the stage one SCI message 912 transmitted by each transmitter UE may indicate radio resources (e.g., time and frequency resources) that are occupied by the respective transmitter UE, which may enable backward compatibility with existing sidelink communication techniques that use two-stage SCI. Furthermore, in a similar manner as described above in connection with FIGS. 8A-8C, the stage one SCI message 912 can be used for heartbeat detection to maintain respective unicast links from each respective transmitter UE to the receiver UE. Furthermore, the stage one SCI message 912 and/or the configured grant(s) used to transmit the PSSCH to the receiver UE may specify all parameters related to the PSSCH transmissions, whereby the transmitter UEs may refrain from transmitting a stage two SCI message that would otherwise be used in legacy sidelink communications to indicate UE-specific transmission parameters. Additionally, or alternatively, the transmitter UE may transmit additional SCI to one or more of the receiver UEs to override one or more transmission parameters. For example, in some aspects, one or more transmitter UEs may transmit an additional UE-specific stage one SCI message that points to a stage two SCI message overriding a transmission parameter, such as an MCS configuration, indicated in the stage one SCI message 912.

Figure 9B:
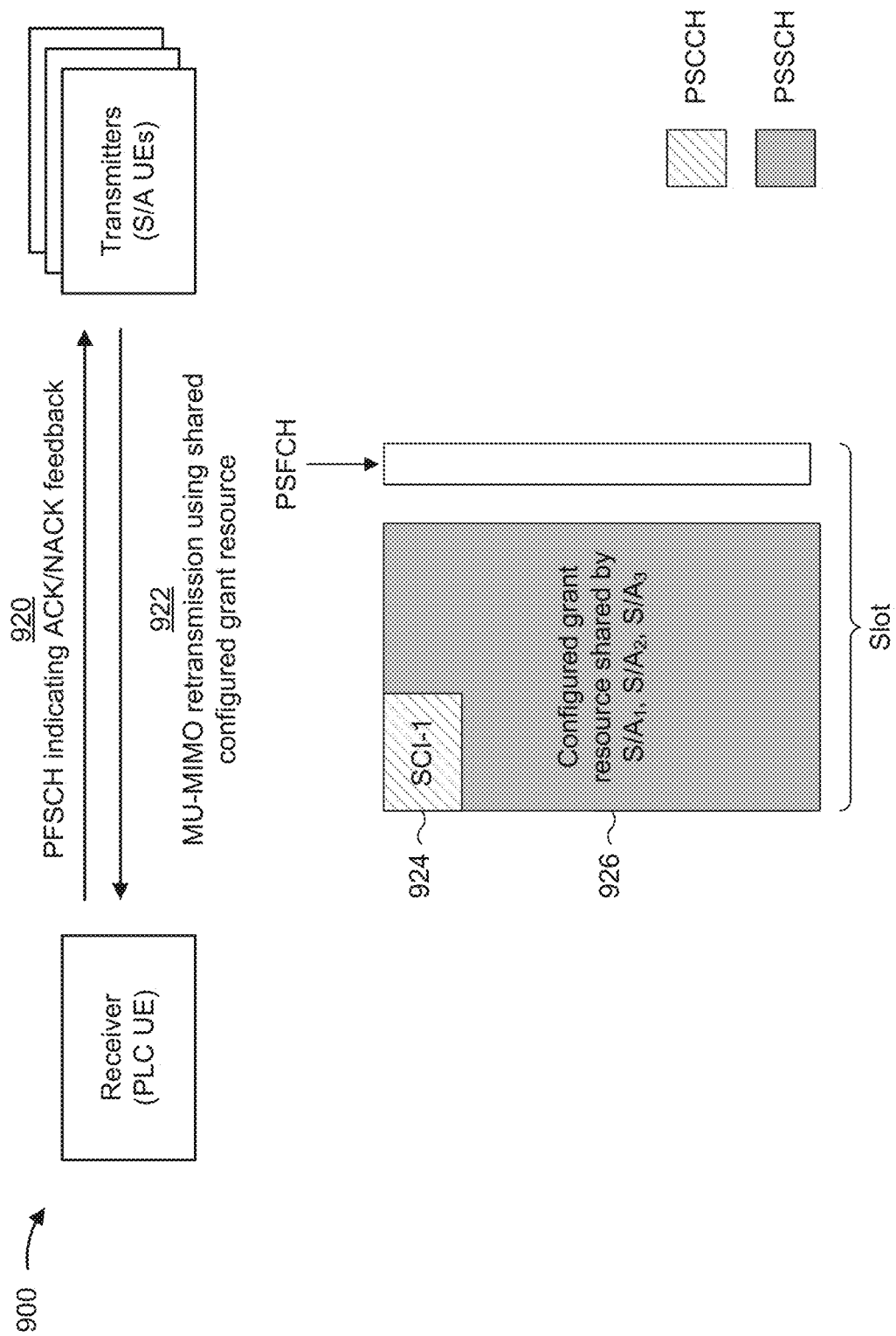

As shown in FIG. 9B, and by reference number 920, the one or more transmitter UEs may each receive (e.g., using antenna 252, DEMOD 254, MIMO detector 256, receive processor 258, controller/processor 280, reception component 1102, and/or the like) ACK/NACK feedback via a PSFCH from the receiver UE. For example, the transmitter UE(s) may conduct an initial PSSCH transmission to the receiver UE as described above in connection with FIG. 9A. Accordingly, the transmitter UE(s) may each receive ACK/NACK feedback from the receiver UE indicating whether the receiver UE successfully received and decoded, or failed to successfully receive and/or decode, the initial PSSCH transmission from each respective transmitter UE.

As further shown in FIG. 9B, and by reference number 922, the one or more transmitter UEs may conduct (e.g., using controller/processor 280, transmit processor 264, TX MIMO processor 266, MOD 254, antenna 252, transmission component 1106, and/or the like) a multi-user MIMO (MU-MIMO) retransmission of the initial PSSCH transmissions using a configured grant resource that is shared among all of the transmitter UEs. For example, as shown, a stage one SCI message 924 may indicate a sidelink resource 926 in a time and frequency domain that is to be shared among transmitter UEs conducting a retransmission, and the transmitter UEs may be configured through a configured grant to share the sidelink resource 926 (e.g., without a dynamic grant). In some aspects, when multiple transmitter UEs are conducting retransmission using the shared sidelink resource 926, each respective transmitter UE may be configured with orthogonal (or close to orthogonal) demodulation reference signal (DMRS) ports and/or sequences for the MU-MIMO retransmission. Furthermore, in some aspects, the initial PSSCH transmissions by the one or more transmitter UEs may be associated with a target reliability metric (e.g., a block error rate (BLER)) that is selected to ensure that a number of transmitter UEs conducting the MU-MIMO retransmission does not overload the shared sidelink resource 926. For example, a target BLER may be set to $10^{-2}$, $10^{-3}$, and/or the like to avoid overloading the shared sidelink resource 926 to be used for the MU-MIMO retransmission.

Accordingly, as shown in FIG. 9B, the transmitter UE(s) that receive a NACK from the receiver UE for the initial PSSCH transmission may jointly transmit the stage one SCI message 924 and the corresponding PSSCH retransmissions over the shared sidelink resource 926 (e.g., radio resource). Furthermore, the shared sidelink resource 926 may be associated with a configured grant to enable the transmitter UE(s) to conduct the MU-MIMO retransmission without a dynamic grant. In some aspects, the transmitter UEs that conduct the MU-MIMO retransmission may be further configured to use respective power offsets that are based at least in part on a number of other transmitter UEs that are triggered to conduct a retransmission based on a NACK from the receiver UE. For example, in some aspects, the respective power offsets used by the transmitter UE(s) may be proportional to a total amount of radio resources associated with the configured grant that was used for the initial PSSCH transmission(s).

Figure 9C:
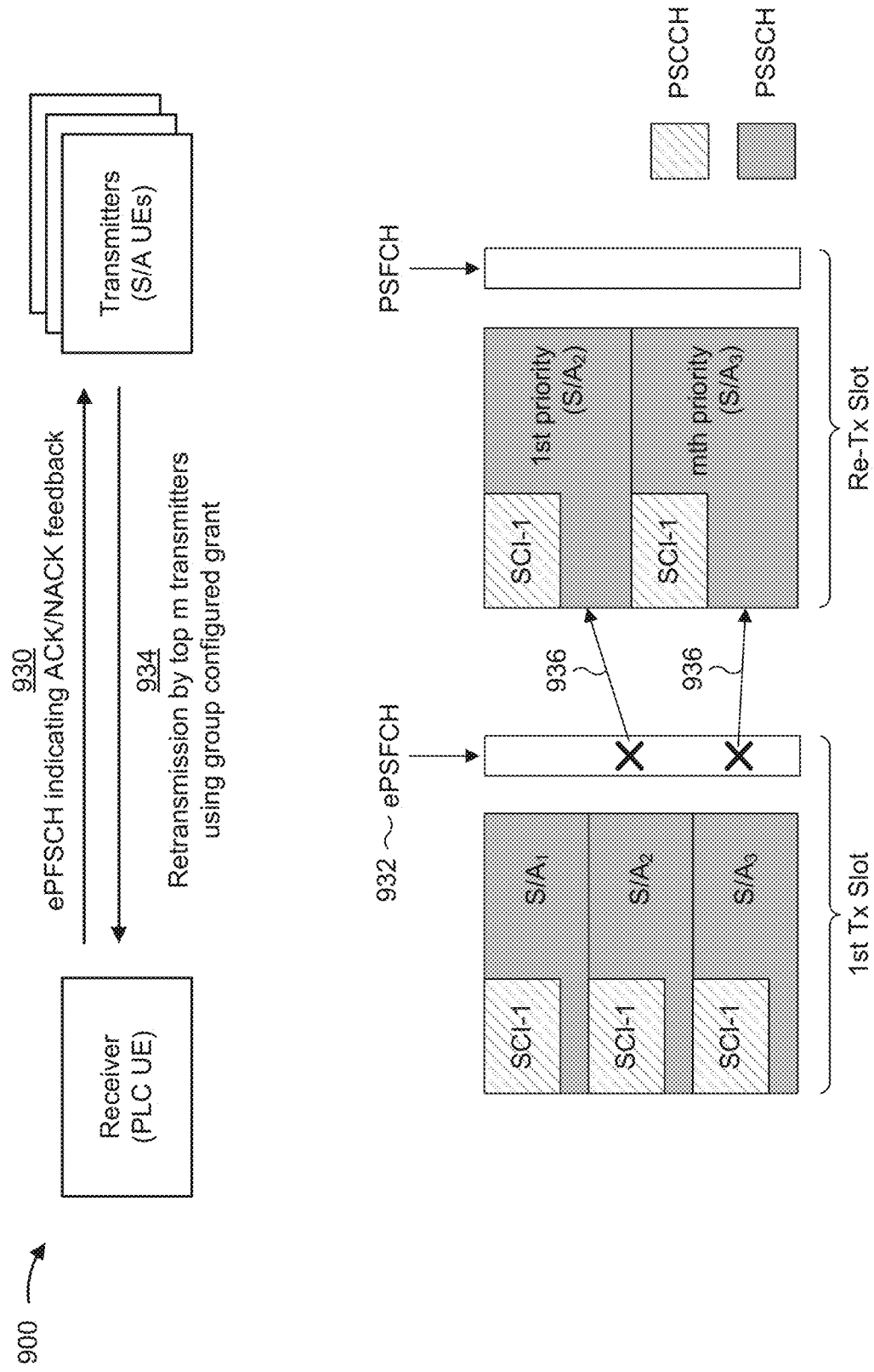

Alternatively, as shown in FIG. 9C, and by reference number 930, the one or more transmitter UEs may each receive (e.g., using antenna 252, DEMOD 254, MIMO detector 256, receive processor 258, controller/processor 280, reception component 1102, and/or the like) ACK/NACK feedback via an enhanced PSFCH (ePSFCH) 932 transmitted by the receiver UE. In this case, as shown by reference number 934, the top m transmitter UEs that receive NACK feedback from the receiver UE may conduct (e.g., using controller/processor 280, transmit processor 264, TX MIMO processor 266, MOD 254, antenna 252, transmission component 1106, and/or the like) a PSSCH retransmission using a group configured grant in the retransmission slot. For example, the parameter m may indicate the maximum number of transmitter UEs that are permitted to conduct the PSSCH retransmission using the group configured grant, and the parameter m may have a value that is configured by RRC signaling (e.g., access link (or Uu) RRC signaling, sidelink (or PC5) RRC signaling, and/or the like).

Additionally, or alternatively, the value of the parameter m may be indicated in downlink control information or other suitable signaling activating the group configured grant. For example, as shown by reference number 936, FIG. 9C illustrates a case in which m is set to two (2), whereby a maximum of two transmitter UEs that receive NACK feedback from the receiver UE are permitted to retransmit a PSSCH using the group configured grant resource. For example, as shown each of the top m transmitter UEs that are conducting retransmission may receive an equal share of the group configured grant resource (e.g., half of the frequency resources may be allocated to each re-transmitting UE in cases where m is set to 2).

In some aspects, the group configured grant may include a priority list or other priority indication for each respective transmitter UE, which may be used to determine the top m transmitter UEs, and the priority for each respective transmitter UE may be time-varying according to a time-updating rule that may be specified by RRC or other suitable signaling (e.g., to ensure that the group configured grant resource is fairly shared among all transmitter UEs). Accordingly, in some aspects, each transmitter UE may need to decode the HARQ feedback carried in the ePSFCH 932 for all other transmitter UEs sharing the same group configured grant to determine the number of transmitter UEs that receive a NACK from the receiver UE and to determine respective priorities associated with each transmitter UE that receives a NACK from the receiver UE. In this way, each transmitter UE that receives a NACK may self-determine whether the respective transmitter UE is in the top m transmitter UEs that are permitted to conduct a PSSCH retransmission in the retransmission slot.

Figure 9D:
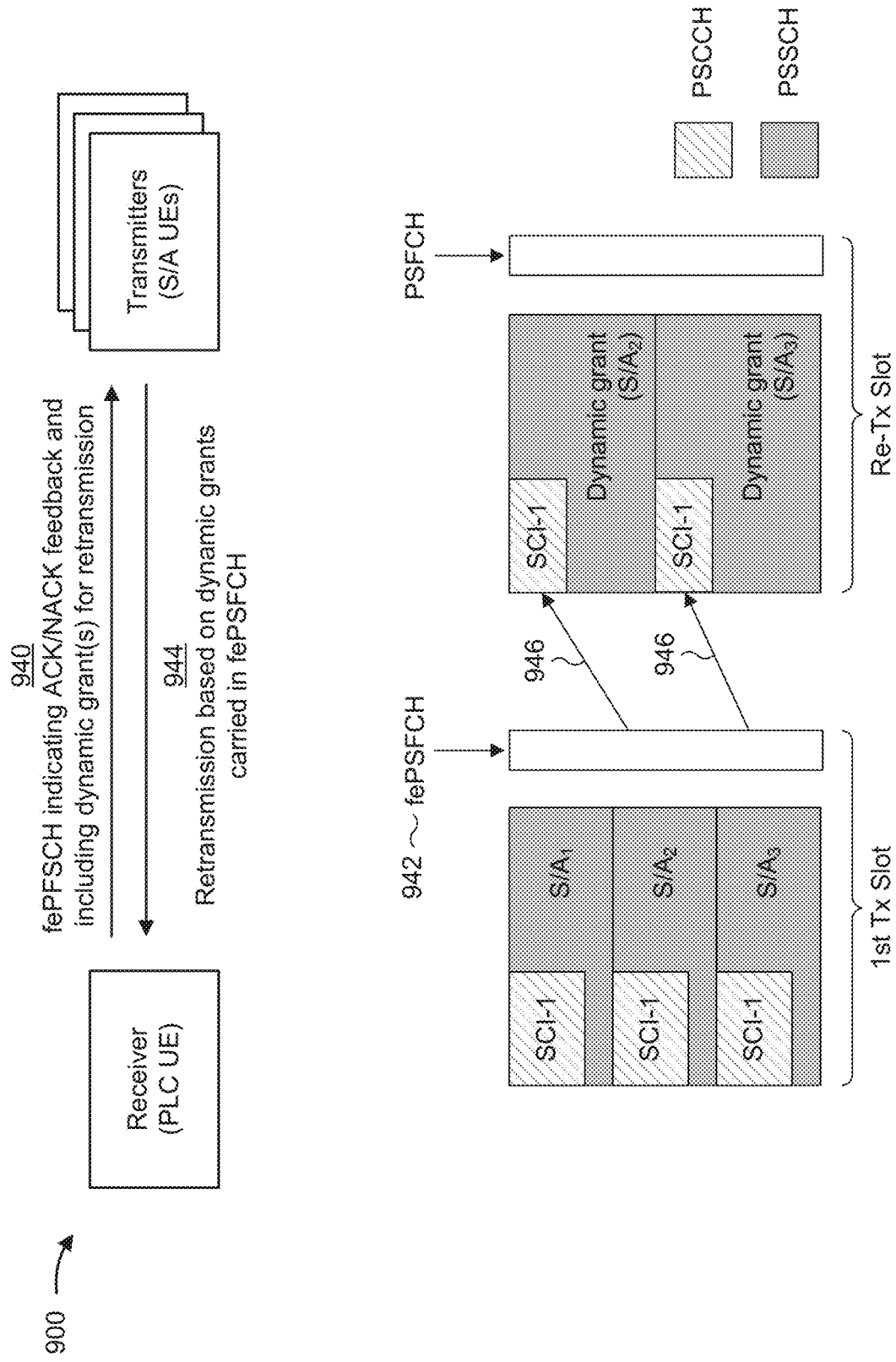

Alternatively, as shown in FIG. 9D, and by reference number 940, the one or more transmitter UEs may each receive (e.g., using antenna 252, DEMOD 254, MIMO detector 256, receive processor 258, controller/processor 280, reception component 1102, and/or the like) ACK/NACK feedback via a further enhanced PSFCH (fePSFCH) 942 transmitted by the receiver UE. In this case, in addition to carrying ACK/NACK feedback for the initial PSCCH transmission(s) from the transmitter UE(s), the fePSFCH 942 may include one or more dynamic grants for one or more retransmissions (e.g., corresponding to initial PSSCH transmissions associated with NACK feedback). Accordingly, as shown by reference number 944, one or more transmitter UEs that receive NACK feedback from the receiver UE and also receive a dynamic grant for a retransmission may conduct (e.g., using controller/processor 280, transmit processor 264, TX MIMO processor 266, MOD 254, antenna 252, transmission component 1106, and/or the like) the PSSCH retransmission using a group configured grant in the retransmission slot.

For example, as shown by reference number 946, the fePSFCH 942 received from the receiver UE may include a NACK for the initial PSSCH transmission from a second and third transmitter UE (shown as S/A$_2$ and S/A$_3$), which are also given dynamic grants that may be separately or jointly encoded in the fePSFCH 942. Accordingly, each transmitter UE that receives NACK feedback from the receiver UE may further determine whether the fePSFCH 932 includes a dynamic grant for the respective transmitter UE, in which case the transmitter UE may retransmit the PSSCH in the retransmission slot.

Additionally, or alternatively, in some aspects, the retransmission techniques illustrated in FIG. 9C and FIG. 9D may be used in combination to provide additional flexibility in scheduling sidelink retransmissions, to enable greater sidelink retransmission capacity, to reduce overhead associated with dynamic grants used for sidelink retransmissions, and/or the like. For example, to combine the retransmission techniques illustrated in FIG. 9C and FIG. 9D, which respectively use a priority list and dynamic grants to determine which transmitter UE(s) are to conduct a retransmission, the receiver UE may indicate that radio resources associated with the group configured grant to be used for the PSSCH retransmission(s) are to be partitioned into two portions. The two portions may include a first portion to support retransmissions by the top m transmitter UEs that receive NACK feedback and a second portion to support retransmissions by transmitter UEs that receive a dynamic grant for a PSSCH retransmission. In some aspects, the first and second portions of the radio resources associated with the group configured grant may be equal, or the first and second portions may be unequal (e.g., to enable more flexibility, increase capacity for one group of retransmitting UEs, to reduce dynamic grant overhead, and/or the like).

Accordingly, each retransmission candidate (e.g., transmitter UE that receives NACK feedback) may determine whether the PSFCH (or ePSFCH or fePSFCH) includes a dynamic grant for a PSSCH retransmission. Any retransmission candidates that receive a dynamic grant may use a share of the second portion of the radio resources that are allocated to support retransmissions by the transmitter UEs that receive a dynamic grant for a PSSCH retransmission, and each such transmitter UEs may exclude itself from competing for the top m positions to use the other portion of the radio resources that are allocated to support retransmissions by the top m transmitter UEs that receive NACK feedback. Accordingly, among the remaining retransmission candidates (e.g., transmitter UEs that received NACK feedback but did not receive a dynamic grant for a PSSCH retransmission), the top m retransmission candidates may conduct a PSSCH retransmission using the portion of the radio resources that are allocated to support retransmissions by the top m transmitter UEs in a similar manner as described above with reference to FIG. 9C.

As indicated above, FIGS. 9A-9D are provided as examples. Other examples may differ from what is described with regard to FIGS. 9A-9D.

Figure 10:
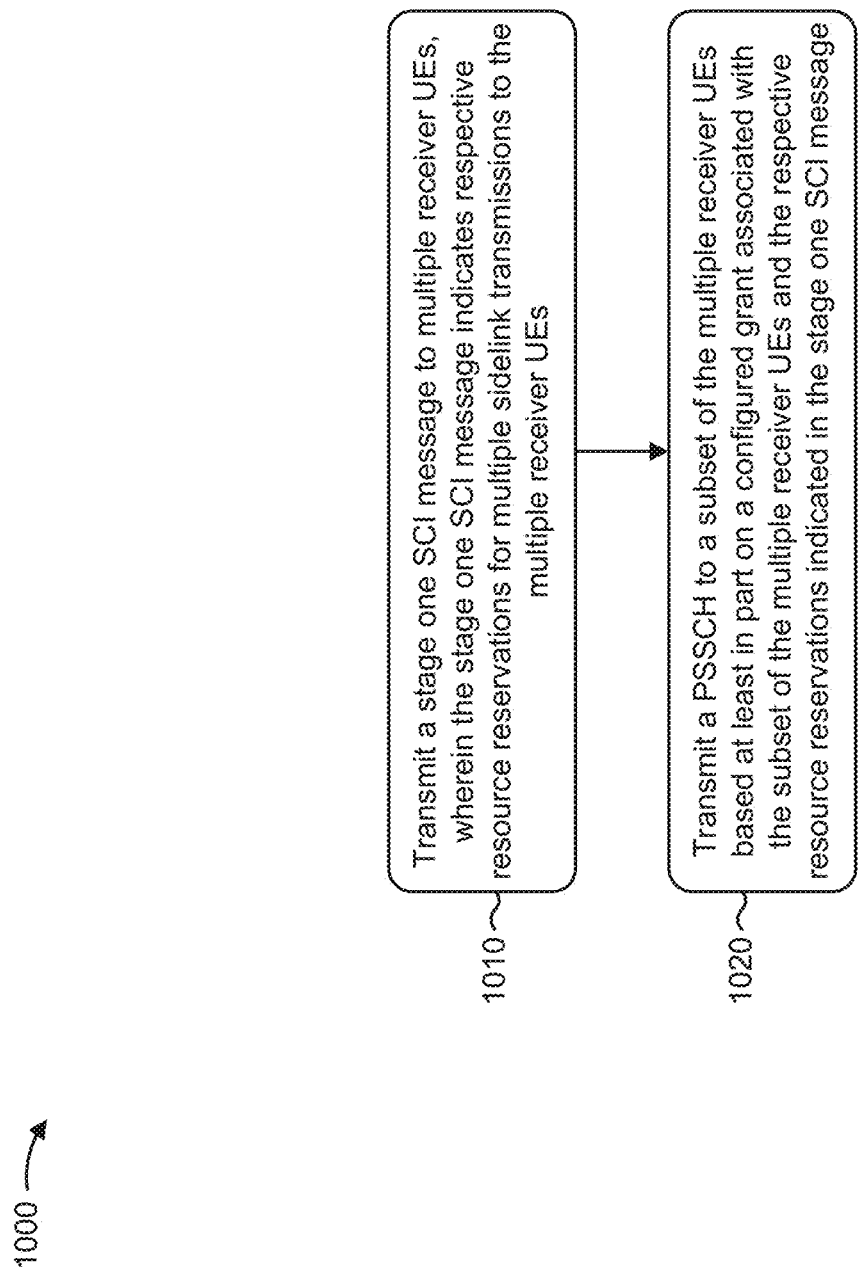
FIG. 10 is a diagram illustrating an example process associated with URLLC over a sidelink, in accordance with various aspects of the present disclosure.

FIG. 10 is a diagram illustrating an example process 1000 performed, for example, by a transmitter UE, in accordance with various aspects of the present disclosure. Example process 1000 is an example where the transmitter UE (e.g., UE 120, UE 305, UE 405, UE 410, PLC UE 515, PLC UE 712, and/or the like) performs operations associated with URLLC over a sidelink.

As shown in FIG. 10, in some aspects, process 1000 may include transmitting a stage one SCI message to multiple receiver UEs, wherein the stage one SCI message indicates respective resource reservations for multiple sidelink transmissions to the multiple receiver UEs (block 1010). For example, the transmitter UE may transmit (e.g., using controller/processor 280, transmit processor 264, TX MIMO processor 266, MOD 254, antenna 252, memory 282, and/or the like) a stage one SCI message to multiple receiver UEs, as described above. In some aspects, the stage one SCI message indicates respective resource reservations for multiple sidelink transmissions to the multiple receiver UEs.

As further shown in FIG. 10, in some aspects, process 1000 may include transmitting a PSSCH to a subset of the multiple receiver UEs based at least in part on a configured grant associated with the subset of the multiple receiver UEs and the respective resource reservations indicated in the stage one SCI message (block 1020). For example, the transmitter UE may transmit (e.g., using controller/processor 280, transmit processor 264, TX MIMO processor 266, MOD 254, antenna 252, memory 282, and/or the like) a PSSCH to a subset of the multiple receiver UEs based at least in part on a configured grant associated with the subset of the multiple receiver UEs and the respective resource reservations indicated in the stage one SCI message, as described above.

Process 1000 may include additional aspects, such as any single aspect or any combination of aspects described below and/or in connection with one or more other processes described elsewhere herein.

In a first aspect, the respective resource reservations indicated in the stage one SCI message indicate multiple sub-channels that are occupied by the transmitter UE in one or more transmission time intervals. In a second aspect, alone or in combination with the first aspect, the stage one SCI message includes a heartbeat signal to maintain unicast links from the transmitter UE to the multiple receiver UEs. In a third aspect, alone or in combination with one or more of the first and second aspects, the configured grant associated with the subset of the multiple receiver UEs is configured by a base station using access link RRC signaling or the transmitter UE using sidelink RRC signaling.

In a fourth aspect, alone or in combination with one or more of the first through third aspects, the stage one SCI message is a common stage one SCI message that indicates an MCS configuration for the multiple receiver UEs, and process 1000 includes transmitting a UE-specific stage one SCI message to one or more of the multiple receiver UEs, where the UE-specific stage one SCI message points to a stage two SCI message, and transmitting the stage two SCI message to the one or more of the multiple receiver UEs, where the stage two SCI message includes one or more parameters to override the MCS configuration indicated in the common stage one SCI message for the multiple receiver UEs.

In a fifth aspect, alone or in combination with one or more of the first through fourth aspects, the stage one SCI message includes a pointer to a stage two SCI message that indicates whether the PSSCH is present for each of the multiple receiver UEs. In a sixth aspect, alone or in combination with one or more of the first through fifth aspects, the stage two SCI message includes a bitmap to indicate whether the PSSCH is present for each of the multiple receiver UEs. In a seventh aspect, alone or in combination with one or more of the first through sixth aspects, process 1000 includes receiving, via a PSFCH, feedback from the subset of the multiple receiver UEs for which the stage two SCI message indicates that the PSSCH is present, where the feedback received from each receiver UE indicates whether the respective receiver UE successfully received the PSSCH. In an eighth aspect, alone or in combination with one or more of the first through seventh aspects, the stage two SCI message indicates whether the PSSCH is present for each of the multiple receiver UEs according to a presence flag used for multi-path diversity or variable-rate control for each respective receiver UE.

In a ninth aspect, alone or in combination with one or more of the first through eighth aspects, process 1000 includes determining, based at least in part on feedback received via a PSFCH, one or more of the multiple receiver UEs that failed to successfully receive the PSSCH, and transmitting, to the one or more receiver UEs that failed to successfully receive the PSSCH, an additional stage one SCI message that includes a pointer to a stage two group SCI message, where the additional stage one SCI message and the stage two group SCI message schedule a retransmission of the PSSCH for the one or more receiver UEs that failed to successfully receive the PSSCH. In a tenth aspect, alone or in combination with one or more of the first through ninth aspects, the additional stage one SCI message indicates a total resource usage for the retransmission scheduled for the one or more receiver UEs that failed to successfully receive the PSSCH. In an eleventh aspect, alone or in combination with one or more of the first through tenth aspects, the stage two group SCI message includes information related to respective sidelink grants for the retransmission scheduled for the one or more receiver UEs that failed to successfully receive the PSSCH. In a twelfth aspect, alone or in combination with one or more of the first through eleventh aspects, the stage two group SCI message includes a single cyclic redundancy check.

In a thirteenth aspect, alone or in combination with one or more of the first through twelfth aspects, the transmitter UE is a PLC UE, and the multiple receiver UEs are S/A UEs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
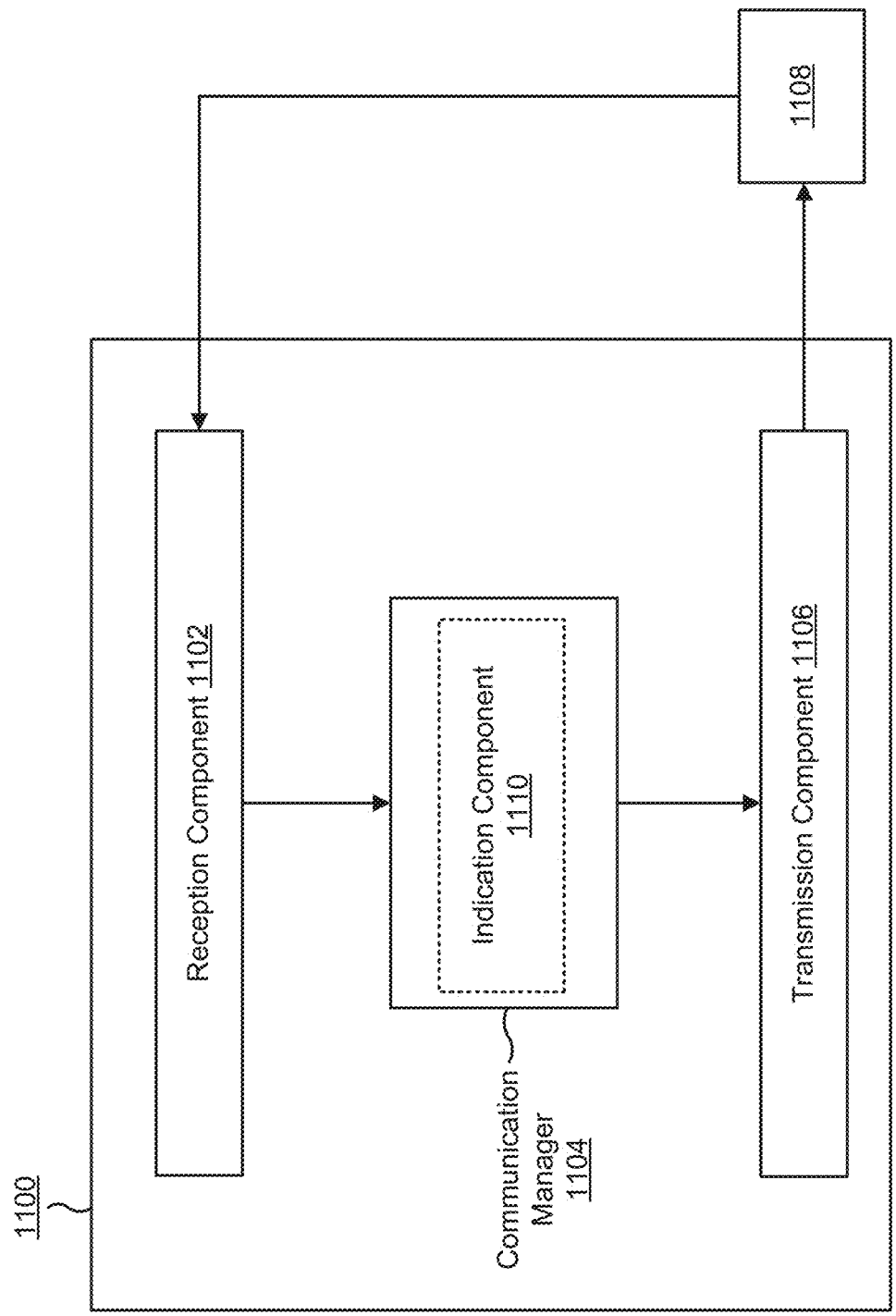
FIG. 11 is a block diagram of an example apparatus for wireless communication, in accordance with various aspects of the present disclosure.

FIG. 11 is a block diagram of an example apparatus 1100 for wireless communication in accordance with various aspects of the present disclosure. The apparatus 1100 may be a transmitter UE, or a transmitter UE may include the apparatus 1100. In some aspects, the apparatus 1100 includes a reception component 1102, a communication manager 1104, and a transmission component 1106, which may be in communication with one another (e.g., via one or more buses). As shown, the apparatus 1100 may communicate with another apparatus 1108 (e.g., a receiver UE, a base station, or another wireless communication device) using the reception component 1102 and the transmission component 1106.

In some aspects, the apparatus 1100 may be configured to perform one or more operations described herein in connection with FIG. 7, FIGS. 8A-8C, and/or FIGS. 9A-9D. Additionally, or alternatively, the apparatus 1100 may be configured to perform one or more processes described herein, such as process 1000 of FIG. 10. In some aspects, the apparatus 1100 may include one or more components of the UE 120 described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (e.g., filtering, amplification, demodulation, analog-to-digital conversion, demultiplexing, deinterleaving, de-mapping, equalization, interference cancellation, decoding, and/or the like), and may provide the processed signals to the one or more other components. In some aspects, the reception component 1102 may include one or more antennas, a demodulator, a MIMO detector, a receive processor, a controller/processor, a memory, or a combination thereof, of the UE 120 described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (e.g., filtering, amplification, modulation, digital-to-analog conversion, multiplexing, interleaving, mapping, encoding, and/or the like), and may transmit the processed signals to the apparatus 1108. In some aspects, the transmission component 1106 may include one or more antennas, a modulator, a transmit MIMO processor, a transmit processor, a controller/processor, a memory, or a combination thereof, of the UE 120 described above in connection with FIG. 2. In some aspects, the transmission component 1106 may be co-located with the reception component 1102 in a transceiver.

The communication manager 1104 may transmit or may cause the transmission component 1106 to transmit a stage one SCI message to multiple receiver UEs. For example, in some aspects, the stage one SCI message may indicate respective resource reservations for multiple sidelink transmissions to the apparatus 1108 and/or other apparatuses. The communication manager 1104 may transmit or may cause the transmission component 1106 to transmit a PSSCH to the apparatus 1108 and/or other apparatuses based at least in part on a configured grant associated with the apparatus 1108 and/or other apparatuses and the respective resource reservations indicated in the stage one SCI message. In some aspects, the communication manager 1104 may include a controller/processor, a memory, or a combination thereof, of the UE 120 described above in connection with FIG. 2.

In some aspects, the communication manager 1104 may include a set of components, such as an indication component 1110 and/or the like. Alternatively, the set of components may be separate and distinct from the communication manager 1104. In some aspects, one or more components of the set of components may include or may be implemented within a controller/processor, a memory, or a combination thereof, of the UE 120 described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The indication component 1110 may configure a stage one SCI message to indicate respective resource reservations for multiple sidelink transmissions to multiple receiver UEs. The transmission component 1106 may transmit the stage one SCI message to the multiple receiver UEs, and the transmission component 1106 may further transmit a PSSCH to a subset of the multiple receiver UEs based at least in part on a configured grant associated with the subset of the multiple receiver UEs and the respective resource reservations indicated in the stage one SCI message.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a transmitter user equipment (UE), comprising:
    transmitting a common stage one sidelink control information (SCI) message to multiple receiver UEs,
        wherein the common stage one SCI message indicates respective resource reservations, for multiple sidelink transmissions to the multiple receiver UEs, indicating a set of sub-channels that the transmitter UE is occupying in one or more transmission time intervals for transmitting respective configured grant data, associated with the multiple receiver UEs, to the multiple receiver UEs, and
        wherein the common stage one SCI message occupies all time and frequency resources to be used by the transmitter UE for transmitting a physical sidelink shared channel (PSSCH) to the multiple receiver UEs; and
    transmitting the PSSCH, including the respective configured grant data, to the multiple receiver UEs based at least in part on the respective resource reservations indicated in the common stage one SCI message.

2. The method of claim 1, wherein the respective resource reservations indicate multiple sub-channels, including the set of sub-channels, that the transmitter UE is occupying in the one or more transmission time intervals for transmitting the respective configured grant data to the multiple receiver UEs.

3. The method of claim 1, wherein the common stage one SCI message includes a heartbeat signal to maintain unicast links from the transmitter UE to the multiple receiver UEs.

4. The method of claim 1, wherein the respective configured grant data associated with the multiple receiver UEs is configured by a network node using access link radio resource control (RRC) signaling or the transmitter UE using sidelink RRC signaling.

5. The method of claim 1, wherein the common stage one SCI message indicates a modulation and coding scheme configuration for the multiple receiver UEs, and wherein the method further comprises:
    transmitting a UE-specific stage one SCI message to one or more of the multiple receiver UEs, wherein the UE-specific stage one SCI message points to a stage two SCI message; and
    transmitting the stage two SCI message to the one or more of the multiple receiver UEs, wherein the stage two SCI message includes one or more parameters to override the modulation and coding scheme configuration indicated in the common stage one SCI message for the multiple receiver UEs.

6. The method of claim 1, wherein the common stage one SCI message includes a pointer to a stage two SCI message that indicates whether the PSSCH is present for each of the multiple receiver UEs.

7. The method of claim 6, wherein the stage two SCI message includes a bitmap to indicate whether the PSSCH is present for each of the multiple receiver UEs.

8. The method of claim 6, further comprising:
    receiving, via a physical sidelink feedback channel (PSFCH), feedback from a subset of the multiple receiver UEs for which the stage two SCI message indicates that the PSSCH is present, wherein the feedback received from each of the multiple receiver UEs indicates whether the respective receiver UE successfully received the PSSCH.

9. The method of claim 6, wherein the stage two SCI message indicates whether the PSSCH is present for each of the multiple receiver UEs according to a presence indicator used for multi-path diversity or for variable-rate control for each respective receiver UE.

10. The method of claim 1, further comprising:
    determining, based at least in part on feedback received via a physical sidelink feedback channel (PSFCH), one or more receive UEs, of the multiple receiver UEs, that failed to successfully receive the PSSCH; and
    transmitting, to the one or more receiver UEs that failed to successfully receive the PSSCH, an additional stage one SCI message that includes a pointer to a stage two group SCI message, wherein the additional stage one SCI message and the stage two group SCI message schedule a retransmission of the PSSCH for the one or more receiver UEs that failed to successfully receive the PSSCH.

11. The method of claim 10, wherein the additional stage one SCI message indicates a total resource usage for the retransmission scheduled for the one or more receiver UEs that failed to successfully receive the PSSCH.

12. The method of claim 10, wherein the stage two group SCI message includes information related to respective sidelink grants for the retransmission scheduled for the one or more receiver UEs that failed to successfully receive the PSSCH.

13. The method of claim 10, wherein the stage two group SCI message includes a single cyclic redundancy check.

14. The method of claim 1, wherein the transmitter UE is a programmable logic controller UE, and wherein the multiple receiver UEs are sensor/actuator UEs.

15. A transmitter user equipment (UE) for wireless communication, comprising:
    a memory; and
    one or more processors coupled to the memory, the one or more processors configured to:

transmit a common stage one sidelink control information (SCI) message to multiple receiver UEs,
    wherein the common stage one SCI message indicates respective resource reservations, for multiple sidelink transmissions to the multiple receiver UEs, indicating a set of sub-channels that the transmitter UE is occupying in one or more transmission time intervals for transmitting respective configured grant data, associated with the multiple receiver UEs, to the multiple receiver UEs, and
    wherein the common stage one SCI message occupies all time and frequency resources to be used by the transmitter UE for transmitting a physical sidelink shared channel (PSSCH) to the multiple receiver UEs; and
transmit the PSSCH, including the respective configured grant data, to the multiple receiver UEs based at least in part on the respective resource reservations indicated in the common stage one SCI message.

16. The transmitter UE of claim 15, wherein the respective resource reservations indicate multiple sub-channels, including the set of sub-channels, that the transmitter UE in the one or more transmission time intervals for transmitting the respective configured grant data to the multiple receiver UEs.

17. The transmitter UE of claim 15, wherein the common stage one SCI message includes a heartbeat signal to maintain unicast links from the transmitter UE to the multiple receiver UEs.

18. The transmitter UE of claim 15, wherein the respective configured grant data associated with the multiple receiver UEs is configured by a network node using access link radio resource control (RRC) signaling or the transmitter UE using sidelink RRC signaling.

19. The transmitter UE of claim 15, wherein the common stage one SCI message indicates a modulation and coding scheme configuration for the multiple receiver UEs, and wherein the one or more processors are further configured to:
transmit a UE-specific stage one SCI message to one or more of the multiple receiver UEs, wherein the UE-specific stage one SCI message points to a stage two SCI message; and
transmit the stage two SCI message to the one or more of the multiple receiver UEs, wherein the stage two SCI message includes one or more parameters to override the modulation and coding scheme configuration indicated in the common stage one SCI message for the multiple receiver UEs.

20. The transmitter UE of claim 15, wherein the common stage one SCI message includes a pointer to a stage two SCI message that indicates whether the PSSCH is present for each of the multiple receiver UEs.

21. The transmitter UE of claim 20, wherein the stage two SCI message includes a bitmap to indicate whether the PSSCH is present for each of the multiple receiver UEs.

22. The transmitter UE of claim 20, wherein the one or more processors are further configured to:
receive, via a physical sidelink feedback channel (PSFCH), feedback from a subset of the multiple receiver UEs for which the stage two SCI message indicates that the PSSCH is present, wherein the feedback received from each of the receiver UEs indicates whether the respective receiver UE successfully received the PSSCH.

23. The transmitter UE of claim 20, wherein the stage two SCI message indicates whether the PSSCH is present for each of the multiple receiver UEs according to a presence indicator used for multi-path diversity or for variable-rate control for each respective receiver UE.

24. The transmitter UE of claim 15, wherein the one or more processors are further configured to:
determine, based at least in part on feedback received via a physical sidelink feedback channel (PSFCH), one or more receiver UEs, of the multiple receiver UEs, that failed to successfully receive the PSSCH; and
transmit, to the one or more receiver UEs that failed to successfully receive the PSSCH, an additional stage one SCI message that includes a pointer to a stage two group SCI message, wherein the additional stage one SCI message and the stage two group SCI message schedule a retransmission of the PSSCH for the one or more receiver UEs that failed to successfully receive the PSSCH.

25. The transmitter UE of claim 24, wherein the additional stage one SCI message indicates a total resource usage for the retransmission scheduled for the one or more receiver UEs that failed to successfully receive the PSSCH.

26. The transmitter UE of claim 24, wherein the stage two group SCI message includes information related to respective sidelink grants for the retransmission scheduled for the one or more receiver UEs that failed to successfully receive the PSSCH.

27. The transmitter UE of claim 24, wherein the stage two group SCI message includes a single cyclic redundancy check.

28. The transmitter UE of claim 15, wherein the transmitter UE is a programmable logic controller UE, and wherein the multiple receiver UEs are sensor/actuator UEs.

29. A non-transitory computer-readable medium storing one or more instructions for wireless communication, the one or more instructions comprising:
one or more instructions that, when executed by one or more processors of a transmitter user equipment (UE), cause the one or more processors to:
    transmit a common stage one sidelink control information (SCI) message to multiple receiver UEs,
        wherein the common stage one SCI message indicates respective resource reservations, for multiple sidelink transmissions to the multiple receiver UEs, indicating a set of sub-channels that the transmitter UE is occupying in one or more transmission time intervals for transmitting respective configured grant data, associated with the multiple receiver UEs, to the multiple receiver UEs, and
        wherein the common stage one SCI message occupies all time and frequency resources to be used by the transmitter UE for transmitting a physical sidelink shared channel (PSSCH) to the multiple receiver UEs; and
    transmit the PSSCH, including the configured grant data, to the multiple receiver UEs based at least in part on the respective resource reservations indicated in the common stage one SCI message.

30. An apparatus for wireless communication, comprising:
means for transmitting a common stage one sidelink control information (SCI) message to multiple receiver user equipments (UEs),
    wherein the common stage one SCI message indicates respective resource reservations, for multiple sidelink transmissions to the multiple receiver UEs, indicating a set of sub-channels that the apparatus is occupying in one or more transmission time intervals for transmitting respective configured grant data, associated with the multiple receiver UEs, to the multiple receiver UEs, and wherein the common stage one SCI message occupies all time and frequency resources to be used by the apparatus for transmitting a physical sidelink shared channel (PSSCH) to the multiple receiver UEs; and means for transmitting the PSSCH, including the configured grant data, to the multiple receiver UEs based at least in part on the respective resource reservations indicated in the common stage one SCI message.

* * * * *